United States Patent [19]

Main

[11] Patent Number: 5,408,267

[45] Date of Patent: Apr. 18, 1995

[54] METHOD AND APPARATUS FOR GAMMA CORRECTION BY MAPPING, TRANSFORMING AND DEMAPPING

[75] Inventor: David R. Main, Boulder Creek, Calif.

[73] Assignee: The 3DO Company, Redwood City, Calif.

[21] Appl. No.: 222,181

[22] Filed: Mar. 31, 1994

Related U.S. Application Data

[63] Continuation-in-part of Ser. No. 87,490, Jul. 6, 1993, abandoned.

[51] Int. Cl.$^6$ ............................................. H04N 5/202
[52] U.S. Cl. ................................... 348/254; 348/674; 327/346; 327/350
[58] Field of Search ......................... 348/254, 674, 675; H04N 5/20, 5/202; 307/492; 328/142, 145

[56] References Cited

FOREIGN PATENT DOCUMENTS 0230873 9/1990 Japan ........................... H04N 5/202

OTHER PUBLICATIONS

Benson, K. Blair, editor in chief, "Television Engineering Handbook", McGraw-Hill (1992, 1986), pp. 2.28, 4.18–4,20, 19.7–19.8. *1.

Primary Examiner—Victor R. Kostak
Assistant Examiner—John W. Miller
Attorney, Agent, or Firm—Fliesler, Dubb, Meyer & Lovejoy

[57] ABSTRACT

Gamma correction is performed by dividing the total gamma transfer function input value range into a plurality of segments. The source RGB data is then mapped into an associated x-position in a "standard" segment, and gamma correction is performed on the mapped value as if it was initially in that standard segment. The resulting corrected value is then de-mapped back into the original input value segment. Only the portion of the gamma correction curve which is within the "standard" segment is processable by the circuitry. The segments into which the input value range is divided may occupy ratiometrically increasing portions of the input value range, with the high-order half of the range designated as the standard segment. The lowest-order portion may be approximated linearly. Mapping into the standard segment then involves shifting the input value to the left until the highest order logic 1 is in the highest order bit position. A linear approximation of the gamma correction function within the standard segment, possibly with a non-linearity corrector, is then used to determine a gamma-corrected version of each mapped RGB value. These values are then de-mapped back to their original input value segments by multiplying the values by a respective scale factor responsive only to the respective input value segment.

57 Claims, 9 Drawing Sheets

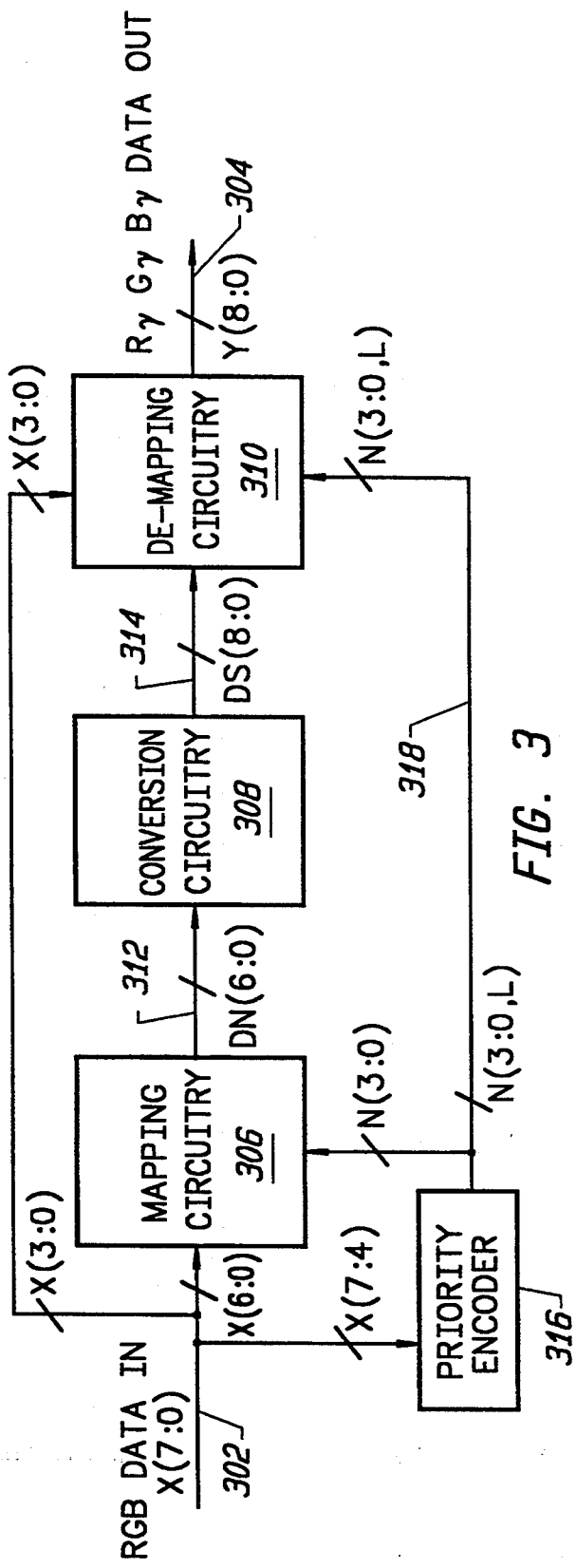
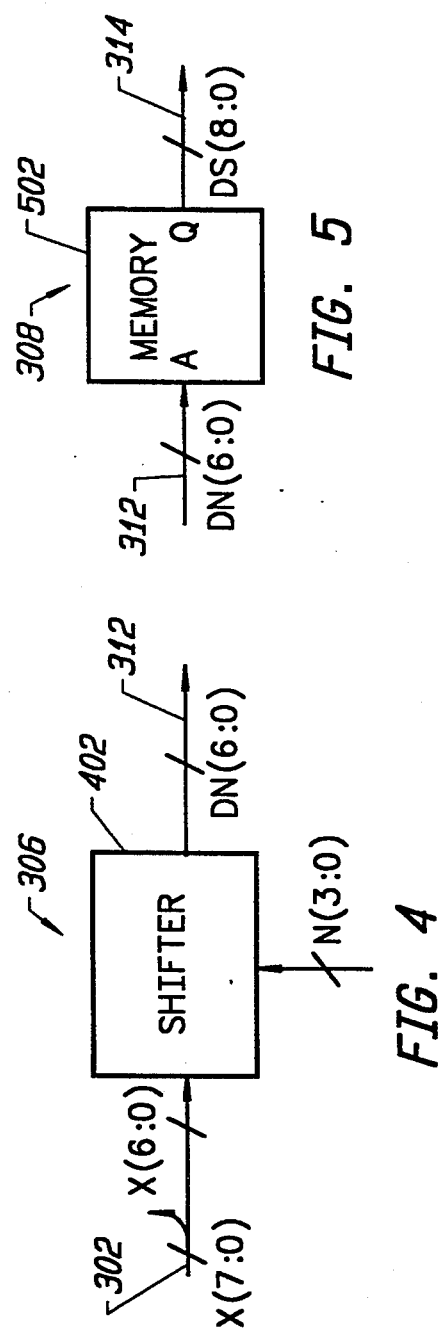

METHOD AND APPARATUS FOR GAMMA CORRECTION BY MAPPING, TRANSFORMING AND DEMAPPING

This is a continuation-in-part of U.S. patent application Ser. No. 08/087,490, filed Jul. 6, 1993, entitled Gamma Correction for Video Encoder, inventor David R. Main, assigned to the assignee of the present application, now abandoned.

BACKGROUND

1. Field of the Invention

The invention relates to circuits for evaluating certain types of functions, such as a power function, and more particularly, to a gamma correction mechanism for a video display which greatly reduces the chip area required for implementation.

2. Description of Related Art

In a typical color television receiver, red, green and blue values are derived from a received encoded signal, and applied to a television display tube to regulate the video driving voltage $E_v$ at each point or pixel along the scan of the electron beam across the display. The electron beam strikes a phosphor which then fluoresces to produce a light output at that point which depends on the video driving voltage applied to the electron beam at that point in time. The relationship of light output to video driving voltage is not linear, but rather is proportional to the video driving voltage raised to a power $\gamma$. That is, the light output L is given by $$L \propto E_v^\gamma.$$

For typical phosphors used in most television receivers, $\gamma$ is usually between about 2.2–2.8.

In order to compensate for this non-linearity of light output, the red, green and blue signals are typically pre-corrected at the transmission source prior to modulation and transmission to the television receiver. This process is known as gamma correction. The gamma correction function is complementary to the phosphor gamma distortion function. That is, the gamma corrected version of a color signal is proportional to the color signal raised to the power of $1/\gamma$. This function may be approximated in many cases. Gamma correction is described in Benson and Whitaker, "Television Engineering Handbook", revised edition (McGraw-Hill: 1992), pp. 2.28, 4.18–4.20, and 19.7–19.8, incorporated herein by reference.

As used herein, values representing desired red, green and blue light output are referred to by the lower case letters r, g and b, respectively. When a red, green or blue value is discussed but it is not important which of the three is being discussed, the value may be referred to as an rgb value, or simply x. All three values are required to define a color at a given pixel position on a phosphored surface, and when such a set of all three values is discussed, they may be referred to herein as an rgb triple. After gamma correction, a $\gamma$ subscript is added to each of the above designations, as in $r_\gamma$, $g_\gamma$, $b_\gamma$, $r_\gamma g_\gamma b_\gamma$ value, and $r_\gamma g_\gamma b_\gamma$ triple. The gamma-corrected version of an input value x is sometimes referred to herein simply as y.

Also, the invention concerns manipulation of physical signals representing rgb values, not merely manipulation of the abstract rgb values themselves, although the reasons for manipulating the physical signals in the manner herein described derive from the mathematical manipulations of the numeric values that the physical signals represent. When physical signals representing one of the above quantities is discussed herein, the signals are sometimes referred to herein by a capitalized version of the designation of the underlying quantity, as in R, G, B, X, RGB value, RGB triple, $R_\gamma$, $G_\gamma$, $B_\gamma$, Y, $R_\gamma G_\gamma B_\gamma$ value and $R_\gamma G_\gamma B_\gamma$ triple. Note that the physical signals representing a value may be carried on several conductors (for example, if the value is represented in binary), and thus the physical signals representing such a value may comprise a group of physical signals. The physical signals may be, for example, electrical signals having a voltage which, when above a predefined threshold represent a logic 1, and which, when below a predefined threshold represent a logic 0.

Note further that although a red, green and blue coordinate system is assumed herein, color signals in another multi-stimulous coordinate system may be operated on in a similar manner to produce similar results.

In the past, gamma correction was performed either digitally or in analog. Analog methods often used a non-linear component such as a diode in a circuit which approximates the $1/\gamma$ power function. Another analog method involves amplifying the color signal by an amplifier having a piecewise linear approximation of the gamma correction function in its feedback network. Both of these methods are imprecise, and because they are analog, they do not lend themselves to direct use in digitally generated or processed image sources.

Digital methods for implementing a gamma correction function have usually involved passing a color value (R, G or B) through a ROM look-up table to generate respective corrected values $R_\gamma$, $G_\gamma$ or $B_\gamma$. The uncorrected RGB signal is applied to the address lines of the ROM and the corrected $R_\gamma G_\gamma B_\gamma$ signal is read from the ROM data output lines. Such a ROM must usually be able to handle eight bits of address input and provide at least eight bits of gamma-corrected output, for a total size of at least 2048 cells. While gamma correction can, at low pixel rates, be multiplexed for the three color components through the same ROM, a 2048 cell ROM still occupies an inordinately large physical area on any integrated circuit chip which is used for processing source video signals to be applied to a phosphor display. Additionally, ROM structures, especially of specifically 2048 bit cells, are often not available or are extremely inefficient to implement in many commercially available gate array technologies. Since the primary application of CRT-based equipment is for price sensitive consumer products, it is desirable to reduce the cost of the gamma correction process as greatly as possible while still retaining the required accuracy to avoid unwanted display artifacts.

SUMMARY OF THE INVENTION

Accordingly, it is an object of the present invention to ameliorate some or all of the above problems.

It is another object of the invention to provide a method and apparatus for performing gamma correction using significantly reduced chip area.

It is another object of the present invention to perform gamma correction algorithmically rather than via a look-up table.

It is another object of the present invention to provide a method and apparatus for converting signals representing input numbers into signals representing output numbers, by a power law conversion.

It is another object of the present invention to provide a method and apparatus for evaluating certain types of mathematical functions using hardware circuitry which significantly reduces chip area.

It is another object of the present invention to provide a highly efficient method for evaluating certain types of mathematical functions.

According to the invention, it has been observed that certain functions, including power functions such as the gamma correction function, exhibit a "self-similarity" characteristic whereby the shape of the transfer function is replicated across different portions of the input value range. The invention takes advantage of this characteristic of the gamma correction curve by first dividing the total transfer function input value range into a plurality of segments. The source or input RGB data is then mapped into an associated x-position in a "standard" segment, and gamma correction is performed on the mapped value as if it was initially in that standard segment. The resulting corrected value is then de-mapped back into the original input value segment. An advantage of this procedure is that only the portion of the gamma correction curve which is within the "standard" segment need be processable by the circuitry.

The self-similarity in a power function is ratiometric. That is, for any two segments which have a similar shape, the ratio of the lengths of the two segments in the x dimension is the same as the ratio of their lower (or upper) boundaries in the x dimension. Advantageously, therefore, to implement the gamma correction function, the segments into which the input value range is divided may occupy ratiometrically increasing portions of the input value range. For example, the high-order half of the input value range may be designated as one segment, the immediately lower-order quarter of the input value range may be designated as another segment, the immediately lower-order eighth of the input value range designated another segment, and so on down to a segment which occupies one $2^{-p'}$th of the input value range (for some positive integer p). Such ratiometric divisions of the input value range may continue until the size of a segment can no longer be represented with the precision of the digital input value, or the last segment of the input value range may instead be approximated linearly. Ratiometric segmentation is also sometimes referred to herein as logarithmic segmentation or geometric segmentation.

If the input values are represented in binary, and if the ratiometric segmentation proceeds according to powers of 2 as in the above example, then the segment corresponding to a given input value is easily determined by reference to the bit position of the highest order logic 1 of the input value. Mapping an input value from one segment to the standard segment then involves simply multiplying the input data by $2^n$, where n is the number of bits (positive, or negative or zero) between the bit position of the highest order logic 1 in the input value, and the bit position of the highest order logic 1 for data within the standard segment. Multiplying by $2^n$ can be accomplished merely by a left shift of n bits. (As used herein, a shift in one direction of n bits is synonymous with a shift in the opposite direction of $-n$ bits.) Preferably the standard segment is chosen as the highest order segment, such that all shifting is to the left (i.e., toward a more significant bit position). This avoids the loss of precision in low-order bits which typically accompanies shifts to the right. As used herein, the terms "left" and "right" define bit positions logically rather than physically. That is, if a first bit position is referred to herein as being to the "left" of a second bit position, then it has a higher order than the second bit position. A conductor on a chip carrying the first bit positions of course need not be physically to the left of a conductor carrying the second bit position.

After data is mapped to the standard segment, the conversion to a gamma corrected value advantageously takes advantage of the excellent approximation which the high order segment of the gamma correction function y(x) bears to a piecewise linear function:

$$y' = C + mx',$$

where
y' is the approximated gamma corrected value,
C is a constant offset given by the true gamma correction function $y(x_{s0})$,
m is a slope coefficient given by:

$$m = [y(x_{s1}) - y(x_{s0})] / (x_{s1} - x_{s0}),$$

$x_{s0}$ is the lower boundary rgb value in the standard segment,
$x_{s1}$ is the upper boundary rgb value in the standard segment,
x' is the amount by which the mapped version of the rgb input value exceeds the lower boundary rgb value in the standard segment and is given by:

$$x' = 2^n x - x_{s0}, \text{ and}$$

n is the number of bits (positive or zero) between the bit position of the highest order logic 1 in the input value X, and the bit position of the highest order logic 1 for input values within the standard segment.

The deviation between the above piecewise linear approximation and the actual gamma correction transfer function y(x) in the standard segment is small, but advantageously the difference is reduced to the limit of the digital quantization error by adding a small non-linear correction factor to produce an overall transfer function of $$y' = C + mx' + F(x'),$$

where F(x') is derived either from combinational logic or from a modest sized ROM having both fewer address lines and fewer output lines than a ROM used for conventional gamma correction. Such a piecewise linear approximation may contain two errors, one from an inexact value of m (which may be advantageously chosen as an inexact value in order to further reduce hardware circuitry), and another from the deviation of the actual gamma correction function y(x) from the straight line approximation. Both errors are advantageously removed with a single properly defined F(x'). As used herein, the term "approximation" includes exactness, exactness being merely a degenerate case of an approximation.

If the input value segments are indeed ratiometrically chosen, then de-mapping the gamma corrected value from the standard segment back to the original input value segment involves merely a multiplication of that value by a scale factor which depends only on the input value segment. In particular, the scale factor K is given by $$K = [y(x_{i1}) - y(x_{i0})] / [y(x_{s1}) - y(x_{s0})]$$

where $x_{s0}$ and $x_{s1}$ are the lower and upper input value boundaries, respectively, of the standard segment;

$x_{i0}$ and $x_{i1}$ are the lower and upper input value boundaries, respectively of the input value segment; and y(x) is the gamma correction function output for an input value of x.

The signals $R_\gamma$, $G_\gamma$ and $B_\gamma$ resulting from the above gamma correction method are either immediately used or ultimately used to control an electron beam incident on a phosphored surface, the light from which is intended to be transmitted to the eyes of a human being and appreciated by that human being for its color and luminance either alone or in the context of an overall image created by a large number of gamma-corrected RGB input values. As such, the data signals that are produced in accordance with the invention ultimately manifest themselves as significant parts of a physically real entity—the displayed image.

Aspects of the invention can also be used to reduce the hardware requirements for implementing functions other than the gamma correction function. Broadly described, in the above technique, an input signal compliance range for a desired transfer function ($y = x^{1/\gamma}$) is segmented into sub-ranges, each of which can individually use an associated transformation process to produce a stimulus to a reduced input compliance range transfer function apparatus whose output can be inverse transformed to produce a system output which is indistinguishable from that which a transfer function apparatus with a full input signal compliance range would produce directly. The input transformation process ("mapping") reduces the compliance range requirements of the transfer function apparatus by permitting the transfer function apparatus to support only those input stimuli which are within the reduced input compliance range (the "standard segment"). The output inverse transformation ("demapping") compensates for the input transformation process.

Whereas replacing a dedicated one-step implementation of transfer function apparatus with a three-step implementation may seem to increase hardware requirements rather than reduce them, for some systems the total cost of input transformation, reduced compliance range transfer function processing, and output inverse transformation is less than the total cost of a system directly performing the transfer function processing over the full input signal compliance range. This is particularly the case where the transformation and inverse transformation are relatively inexpensive, such as multiplying or dividing by powers of two on binary numbers or multiplying with sparse matrix coefficients, while the transfer function processing is both relatively expensive and increases with signal compliance range, as can be the case with non-linear transfer functions such as gamma correction functions. Further benefit can be derived if the segmentation aids in an approximation process of calculation.

One simple example of a prior art system which uses the three-step technique for implementing a mathematical function is a system which implements the function $y = \sin(\theta)$. Instead of implementing a ROM storing $\sin(\theta)$ values for the entire [0, $2\pi$] input value range, implementations of the sin(O) function typically store only the values within one-quarter of the input value range, e.g. [0, $\pi/2$]. The input compliance range is divided into four equal segments, and input transform associated with the segment of an input value $\theta$ maps the input value into the reduced input compliance range [0, $\pi/2$]. An output transform also associated with the input segment maps the ROM output back to the input segment.

It has been discovered that a particular class of transfer functions, specifically those which are self-similar and more specifically those which are ratiometrically self-similar, can benefit significantly from the three-step approach. For these functions a segmentation can be chosen for which all the input transforms are in some manner consistent for the different segments. All of the output inverse transformations are also consistent for the different segments. Consistency of input and output transformations implies a reduction in mapping hardware since substantially the same hardware may be used to map different segments of the input value range. Certain specific transfer functions which are not self-similar can also benefit from the three-step technique, but the input transformation and output inverse transformation will not typically be strictly consistent for each sub-range.

Functions which are ratiometrically self-similar, such as $y = x^{1/\gamma}$, can use the input transformation $x' = x * q$ to produce identical y outputs for each sub-range of x values, with q preferably a power of two when using binary digital methods. In this case, the input processing is consistent and simple, though parameter q will vary according to the input signal sub-range. The output inverse transformation process is also simple, specifically $y = y' * q'$. As used in this paragraph, y is the final output, y' is the transfer function processed x', and q' is a segment-dependent constant which removes the effect of the input transformation.

The choice of input sub-range segmentation criteria depends on the nature of the transfer function. For ratiometrically self-similar functions such as $y = x^{1/\gamma}$, the input range is conveniently divided up into log related segments. In digital signal processing it is convenient to use log base 2. Non-self similar transfer functions, on the other hand, must rely upon non-generalized, application specific, segmentation criteria to use the three-step approach.

The input transformation process results in each point from each segment having a corresponding, though not necessarily unique, value within the reduced input compliance range of the transfer function apparatus. In finite state systems, such as DSP systems with finite data path bits per word, there need not be a one-to-one correspondence of possible input values within a sub-range segment to transfer function apparatus stimulus values. If there are more possible input values within a sub-range segment than are contained in the reduced input compliance range of the transfer function apparatus, then there will be a loss of precision. Such a situation requires an approximation within the input transformation process with multiple input values producing identical stimulus values. This would be the case, for instance, if log segmentation was utilized and the transfer function apparatus had fewer input states than the largest input sub-range segment. It is therefore desirable, in order to avoid any loss of signal quality, for all sub-range input segments to have as many or fewer states than the transfer function apparatus input can process.

The type of apparatus used for performing video gamma correction is capable of many other useful applications. For example, because there is no limitation on the value of γ (although some values are more economical to implement than others), it is possible to use the inventive technique to perform RMS calculations as well. Specifically, a number of samples could be processed through an apparatus having $1/\gamma=2.0$, thereby squaring them and then summing the squares. The sum (derived by this or some other means) is then passed through apparatus having $1/\gamma=0.5$, thereby taking the square root. Judicious choice of the number of samples summed would allow for a simple division process to normalize the result to account for the number of samples processed. RMS conversion is useful in many applications such as where energy levels or non-linear averaging is of concern.

The value of γ to be used in any particular gamma correction system is often largely an arbitrary choice, since different viewers can subjectively prefer different values for different types of images. Thus for one application a manufacturer may choose a strong gamma correction value of $\gamma=2.8$, whereas for another application a manufacturer may instead choose to omit gamma correction entirely (i.e. $\gamma=1$). For still another application, a manufacturer may choose a weak gamma correction value of $\gamma=1.5$.

In order to accommodate these variations economically in a single integrated circuit design, according to another aspect of the invention, the true gamma-corrected output of apparatus as described above can be combined with the uncorrected input value according to a linear combination. That is, linear combination circuitry can be added after true gamma correction apparatus to produce an overall output ŷ given by $$\hat{y} = W_1 y + W_2 x + W_3,$$

where $W_1$, $W_2$ and $W_3$ are selected by a user of the integrated circuit chip. A particularly useful form of the linear combination circuitry requires $W_3=0$ and $W_2=(1-W_1)$, thus permitting user-specification of only one value hereinafter called W. Effectively, this form of linear combination performs weighted averaging of the true gamma-corrected output y with the uncorrected input x:

$$y = Wy + (1-W)x,$$

where W is selectable by a user of the integrated circuit chip.

In the weighted averaging form, if $W=1$, then the true gamma-corrected output will be selected, whereas if $W=0$, then the uncorrected input value will be selected. If the system permits user-selection of only $W=0$ or $W=1$, then the weighted average degenerates into a pure selection between the true gamma-corrected output and the uncorrected input.

In systems where W can be chosen between $W=0$ and $W=1$, while the overall output ŷ as a function of x will not exactly match any true power law function if W is selected to be between 0 and 1, the approximation is close enough given the subjectively wide tolerance of the gamma correction factor in most systems. Advantageously, the choices made available for W are limited to non-positive integer powers of 2.

BRIEF DESCRIPTION OF THE DRAWINGS

The invention will be described with respect to particular embodiments thereof, and reference will be made to the drawings, in which like members are given like designations, and in which:

FIG. 3 is a block diagram of part of the gamma correction unit of FIG. 1;

FIG. 4 is a block diagram of the mapping circuitry of FIG. 3;

FIGS. 5, 6 and 7 are block diagrams of various implementations of the conversion circuitry of FIG. 3;

DETAILED DESCRIPTION

While the invention can be used to implement many different transfer functions, the embodiments described herein illustrate how the invention can be used to implement one example of such a transfer function, specifically a gamma correction function. The gamma correction function is ratiometrically self-similar since, if the input value range is divided into logarithmically increasing sized segments, any segment of the curve can be made precisely congruent with any other segment of the curve if the two segments are separately bounded by rectangles having their lower left and upper right corners located on the curve, and the smaller rectangle and curve portion expanded independently in the x and y dimensions to the same respective size as the larger rectangle.

Figure 1:
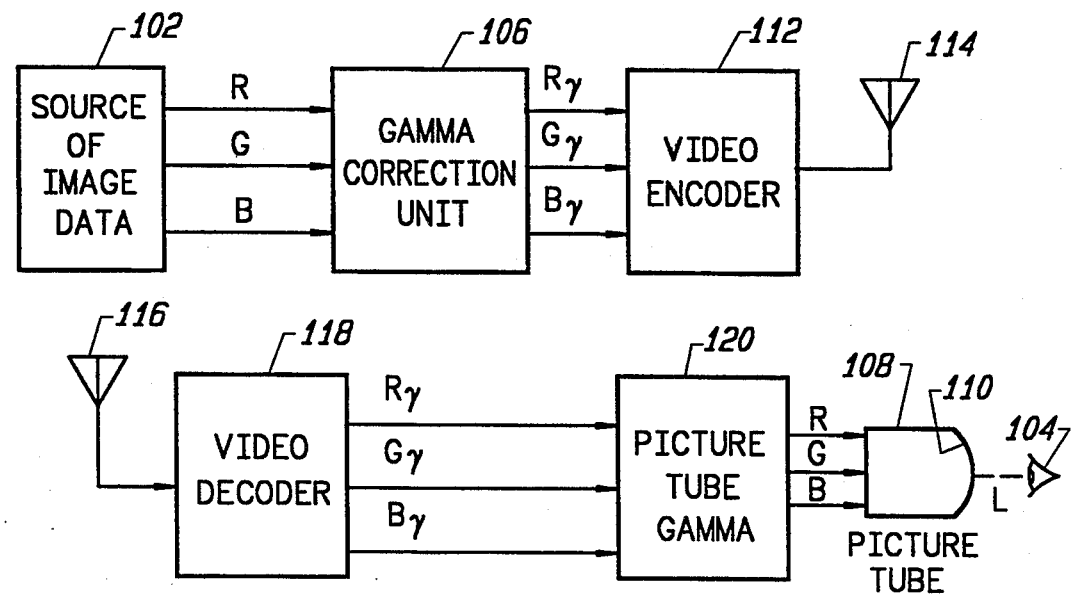
FIG. 1 is a simplified block diagram of apparatus which incorporates the invention.

FIG. 1 is a simplified block diagram of a color television system which incorporates the invention, showing components beginning with a source 102 of image data and ending with a human observer 104. Image data is provided to gamma correction circuitry 106 in the form of three digital streams carrying R, G and B signals. A single RGB triple is provided for each pixel to be displayed on a picture tube 108, the RGB triples being provided in a predetermined sequence corresponding to the horizontal and vertical scans of an electron beam (not shown) in the picture tube 108 against a phosphor backing 110.

The gamma correction unit 106 performs gamma correction in the manner hereinafter described, separately on each value in each RGB triple. The gamma-corrected signals $R_\gamma$, $G_\gamma$ and $B_\gamma$ are coupled to a video encoder 112 which modulates the color information onto a color subcarrier, adds audio and synch information, and RF modulates the resulting signal for transmission via a sending antenna 114 to a receiving antenna 116. Alternatively, the composite signal may be transmitted via cable, the RF modulation being optionally omitted.

The signal from antenna 116 is provided in a receiver to a video decoder 118 which receives the gamma-corrected triples $R_\gamma G_\gamma B_\gamma$ for each pixel of incoming information. These values are converted to analog voltage signals and applied to control the beam energy of the electron beam in picture tube 108 at appropriate positions along the beam's scan of the phosphor 110. The light output L from the phosphor is not linearly related to the analog voltage applied to the beam, but rather, as previously described, follows a power function of $L \propto E^\gamma$. Thus the picture tube's conversion from gamma-corrected RGB values back to linear RGB values is shown symbolically in FIG. 1 as 120.

Figure 2:
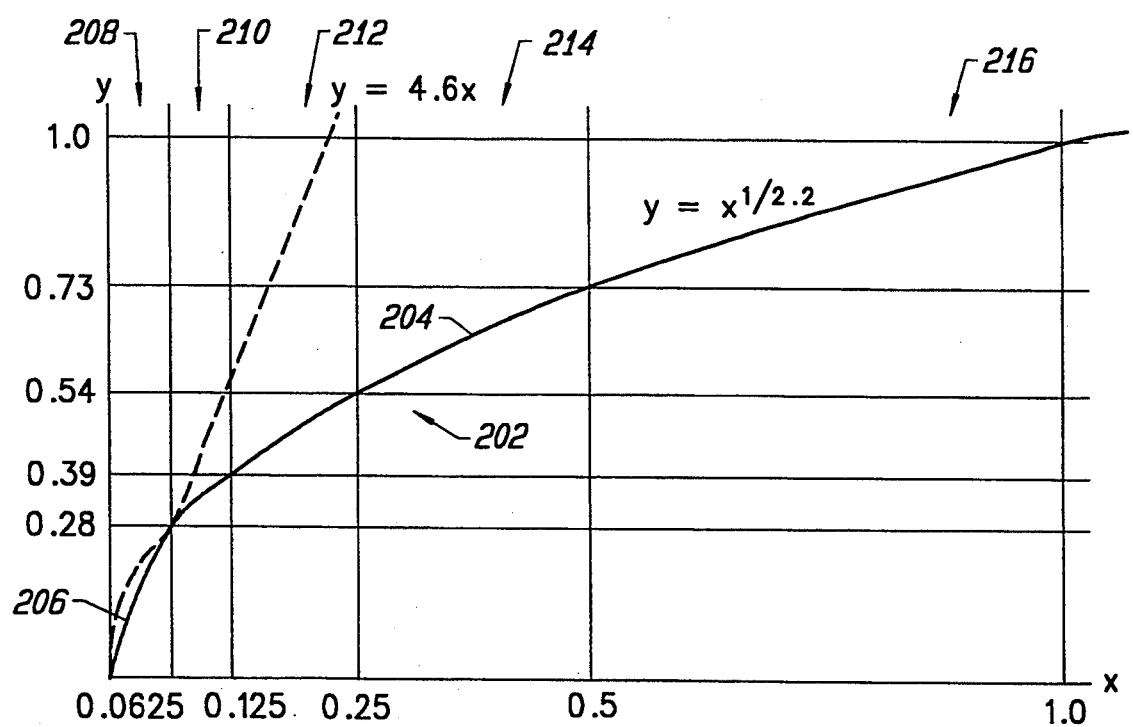
FIG. 2 is a plot of a desired gamma correction transfer function.

FIG. 2 is a plot of the gamma correction transfer function used in the gamma correction unit 106 (FIG. 1). In the present embodiment, the gamma correction transfer function is identical for each of the three colors, red, green and blue, and the circuitry within the gamma correction unit 106 may in fact be multiplexed such that all three conversions are performed by a single circuit.

AS shown in FIG. 2, the input value range spans 0.0–1.0. For values of x between 0.0625–1.0, the transfer function follows the curve $y = x^{1/\gamma}$, where x is one of the r, g or b values normalized to lie between 0 and 1, y is the gamma-corrected r, g or b value normalized to lie between 0 and 1, and $1/\gamma = 1/2.2 = 0.45$. The gamma correction curve in FIG. 2 is designated 202, whereas the portion above x=0.0625 is designated 204. The portion 206 of the gamma correction transfer function 202 which lies below x=0.0625 is linearly approximated by the function y=4.6x.

For the purposes of the present embodiment, the portion 204 of the input value range is conceptually divided into ratiometrically increasing size segments. Specifically, except for the segment 210, the portion of the input value range occupied by each segment is twice the portion occupied by the next lower order segment. That is, segment 210 occupies one-sixteenth of the range; segment 212 occupies one-eighth of the range; segment 214 occupies one-quarter of the range; and segment 216 occupies one-half of the range. Stated another way, if the segments are numbered from the high-order segment 216 down toward the lowest order segment 210 for which the power curve 204 is used, then the portion of the input value range occupied by each segment is given by $2^{-n}$. Stated yet another way, the segments can be numbered from the high-order segment 216 toward the low-order segment 210 by the negative $\log_2$ of the proportion of the input value range which each segment occupies.

FIG. 3 is an overall block diagram of an embodiment of circuitry used to implement the gamma correction for one of the color values R, G or B. The color values are represented in binary as eight physical signals arriving on the 8-bit X bus 302. The logic levels provided on the eight lines of the bus are considered a binary representation of a value between 0 and 255 inclusive, divided by 256. Similarly, the gamma-corrected output values $R_\gamma$, $G_\gamma$ or $B_\gamma$ produced as outputs of the circuitry of FIG. 3 are represented on a Y bus 304 in binary as electrical signals carried on nine lines. As such, the circuitry of FIG. 3 converts input physical signals to output physical signals according to the gamma correction techniques described herein.

It is to be noted that in many instances it is convenient to describe physical signals in terms of the numbers they represent. For example, the following description uses phrases such as "multiplying two values". This is to be read merely as a shorthand way of defining not only the underlying mathematical steps performed by the circuitry, but also the physical steps of receiving signals representing one value, performing a manipulation of those signals corresponding to the mathematical steps, and generating physical output signals representing the indicated result. Such a phrase is further to be read as implying that a finite time is required to propagate signals through the circuitry which performs the manipulation and that such circuitry occupies a finite amount of physical space within a physical system. Emphasis is to be placed on the latter reading, particularly in view of the stated objectives of the invention, which include the implementation of gamma correction in a significantly smaller physical space than conventionally required.

In similar fashion, phrases such as "mapping a value" are to be read merely as a shorthand way of defining the physical steps of receiving signals representing the value, performing a manipulation on the signals which corresponds to the mapping function, and generating physical output signals representing the mapped result. Similar phrases calling for other mathematical manipulations are to be interpreted similarly.

In view of the above, it is understood that the present invention deals with physical entities such as physical signals that represent various numeric values, and signal processing hardware that inputs, processes and outputs such physical signals, as well as image data signals which ultimately cause a physical light image to be rendered on a display and observed by a viewer.

Referring to FIG. 3, the circuitry includes three primary functional units which correspond to the three primary steps of the gamma correction procedure. The RGB data input is provided first to mapping circuitry 306, which maps the input value represented on the X bus 302 to a mapped value which is within a standard segment of the input value range. Referring to FIG. 2, the standard segment is advantageously chosen as the high-order segment 216. The mapped value is represented on a 7-bit DN bus 312, a high-order eighth bit of logic 1 being assumed as a matter of the definition of interactions between priority encoder 316 and mapping circuitry 306. The high-order eighth bit of logic 1 can be assumed since all of the mapped values are within the standard segment, and all of the x values within the standard segment have a high-order bit of logic 1.

The mapped value on the DN bus 312 is provided to conversion circuitry 308, which converts the mapped value according to the gamma correction transfer function within the standard segment 216, as if the mapped value was an original input value. Conversion circuitry 308 produces a converted value represented on a 9-bit DS bus 314. The additional bit of precision is desirable because of the relative flatness of the gamma correction transfer function within the standard segment 216. If only 8 bits were produced by conversion circuitry 308, then the relative flatness of the transfer function would cause multiple instances of a given converted value in response to differing mapped values.

The converted value represented on DS bus 314 is provided to de-mapping circuitry 310, which maps the converted value back to the original input value segment. The output of de-mapping circuitry 310 represents the $R_\gamma$, $G_\gamma$ or $B_\gamma$ gamma-corrected data output, and is represented in binary on the nine bits of the Y bus 304.

In addition to the mapping circuitry 306, conversion circuitry 308 and de-mapping circuitry 310, the apparatus of FIG. 3 also includes a priority encoder 316 which determines which input value segment includes each input value on the X bus 302. The function of the priority encoder 316 may be considered as being part of either the mapping circuitry 306 or the de-mapping circuitry 310, or both, since its output is used by both. The priority encoder 316 receives as input the high-order four bits X(7:4) of the X bus 302, and drives a 5-bit N output bus 318. Four of the lines on N bus 318, specifically, N(3:0), carry a one-of-four encoded signal indicating the number of bits between the high-order bit X(7) and the highest order bit of X(7:4) which carries a logic 1. Additionally, if the highest order bit on the X bus 302 which carries a logic 1 is below X(4), or if X(7:0)=0, then priority encoder 316 instead asserts only the L bit of N bus 318 to indicate that the input value on X bus 302 is within the linear, or special treatment, segment 208. Only one of the N-bus lines N(3:0, L) can be asserted at a time. The "one-of-four" encoding of bits N(3:0) is preferable to other encoding methods because, as will be seen, it does not require mapping circuitry 306 to include additional circuitry or increase propagation delays in order to decode values of N.

Thus, the following Table I describes the priority encoder 316. The actual combinational implementation is conventional and need not be described. In this table, "d" indicates "don't care".

TABLE I

| PRIORITY ENCODER | | | | | | | | | | | | |
|---|---|---|---|---|---|---|---|---|---|---|---|---|
| X | | | | | | | | N | | | | Segment |
| 7 | 6 | 5 | 4 | 3 | 2 | 1 | 0 | 3 | 2 | 1 | 0 | L | Identified |
| 1 | d | d | d | d | d | d | d | 0 | 0 | 0 | 1 | 0 | 216 |
| 0 | 1 | d | d | d | d | d | d | 0 | 0 | 1 | 0 | 0 | 214 |
| 0 | 0 | 1 | d | d | d | d | d | 0 | 1 | 0 | 0 | 0 | 212 |
| 0 | 0 | 0 | 1 | d | d | d | d | 1 | 0 | 0 | 0 | 0 | 210 |
| 0 | 0 | 0 | 0 | d | d | d | d | 0 | 0 | 0 | 0 | 1 | 208 |

All five bits of the N bus 318 are provided to demapping circuitry 310. Since the output of mapping circuitry 306 is eventually ignored if the input value was in the special treatment segment 208, only bits N(3:0) are provided to mapping circuitry 306. FIG. 4 is a block diagram of mapping circuitry 306, showing its implementation as a mere barrel shifter 402. As previously described, since the segmentation of the input value range has been chosen in a geometric or $\log_2$ fashion, mapping an input value into the standard segment 216 (FIG. 2) involves merely multiplying the input value by $2^n$, where n is the number of bits between X(7) and the highest order bit of X(7:0) which contains a logic 1. In digital logic, such multiplication can be performed merely by shifting the input value to the left by n bits and shifting zeros into the low-order bits. Note that if the highest order bit of X(7:0) which contains a logic 1 is X(7), then the input value was already within the standard segment 216. The value of n is correctly determined to be 0, and the multiplier required to map the input value into the standard segment 216 is correctly $2^0=1$. Shifter 402 thus correctly shifts the input value left by 0 bits, which corresponds to merely passing the input value through to the output of the shifter 402.

As shown in FIG. 4, the low-order seven bits of the X bus 302 are provided to the shifter 402 with the high-order bit, X(7), ignored. N(3:0) is also provided to the shifter 402. The shifter 402 itself is made up of a plurality of data selectors in a conventional manner, which select one of four differently shifted versions of X(6:0) onto the DN(6:0) output bus 312 in response to the four respective signals on N(3:0).

The conversion circuitry 308 (FIG. 3) may be implemented as a ROM having seven address inputs and nine data outputs for a total of 1152 cells. This is shown in FIG. 5, in which the DN(6:0) bus 312 is provided to the address inputs of a memory 502, the Q outputs of which drive the DS(8:0) bus 314. This is only half the size of a conventional gamma correction ROM supporting equivalent input and output precision. Note that if it is desired to support more than one gamma correction transfer curve in gamma correction unit 106 (FIG. 1), such as by supporting user-selectable values of $\gamma$, then the memory 502 can be made a random access memory. New conversion values for the standard segment 216 can then be downloaded to the memory 502 if the user selects a different value of $\gamma$.

Preferably $\gamma$ is not selectable, however, and in accordance with another aspect of the invention, the conversion is performed algorithmically rather than by look-up. In particular, the portion of the gamma correction transfer function which is within the standard segment 216 is linearly approximated by the equation $$y = mx' + b,$$

where $x' = x - 0.5$. Referring to FIG. 2, it can be seen that $$m = [y(1.0) - y(0.5)]/(1.0 - 0.5) = 0.536 \approx 137/256, \text{ and}$$

$$b = y(0.5) = 0.73 \approx 187/256.$$

Figure 6:
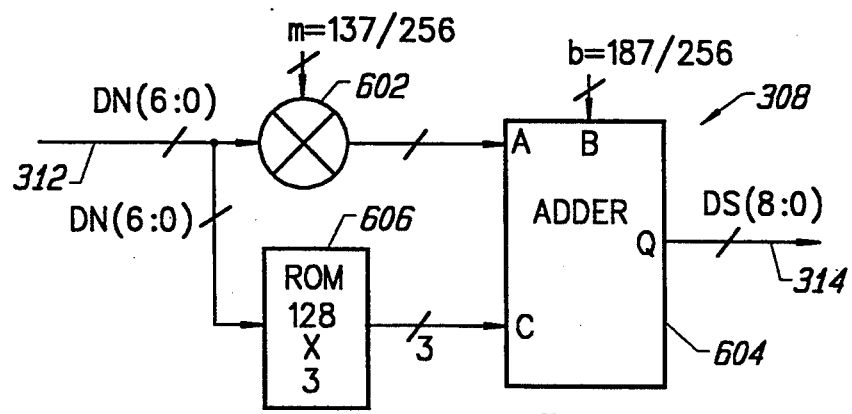

Referring to FIG. 6, the value on DN bus 312 has already been reduced by 0.5 due to the earlier stripping of the high-order logic 1. Thus the seven remaining bits of the DN bus are provided to the multiplicand input of a multiplication circuit 602, and the multiplier input is connected to receive a fixed binary 137 (which is interpreted as $137/256 \approx 0.536$). The output of multiplication circuitry 602 is provided to an A input of an adder 604, the B input of which is connected to receive a binary 187 (which is interpreted as $187/256 \approx 0.73$). Additionally, a small correction ROM 606 is provided which receives the seven bits of the DN bus 312 as an address input, and provides a 3-bit output to a C input of adder 308. The Q output of adder 604 drives the DS(8:0) bus 314.

The ROM 606 is only three bits wide since it has been determined that only three bits of low-order correction information are necessary to correct for the deviation of the straight line approximation from the actual gamma correction curve within the standard segment 216. Furthermore, it has been determined that three low-order bits of correction information are still sufficient even if the value of m provided to multiplication circuitry 602 is reduced to 136/256, a value which permits multiplication circuitry 602 to be implemented extremely sparsely. In particular, multiplication of a mapped value by 136 is equivalent to multiplication by 128 plus multiplication by 8, which can be implemented merely by adding a seven-bit-left-shifted version of the multiplicand to a three-bit-left-shifted version of the multiplicand. Thus the arrangement of FIG. 6 reduces the chip area to be occupied by the conversion circuitry 308 (FIG. 3) significantly below even that of the half-size ROM 502 in FIG. 5.

Numerous variations are possible for further reducing the chip area by, for example, reducing the accuracy of the value used for m and correspondingly increasing the width of the correction ROM 606 in order to accommodate the larger maximum error between the straight line approximation and the true gamma correction curve within the standard segment 216. In addition, further area reductions might be achieved by accepting a reduction in the resolution in the x-dimension with which corrections are made, in order to decrease the length of correction ROM 606. That is, the length of ROM 606 can be halved, for example, if the converted output values are close enough to the true gamma correction curve within the standard segment 216 when only one correction value is maintained for each adjacent pair of input values within the standard segment 216. Moreover, it may further be possible to incorporate the b term into the ROM 606 in order to simplify the adder 604.

Figure 7:
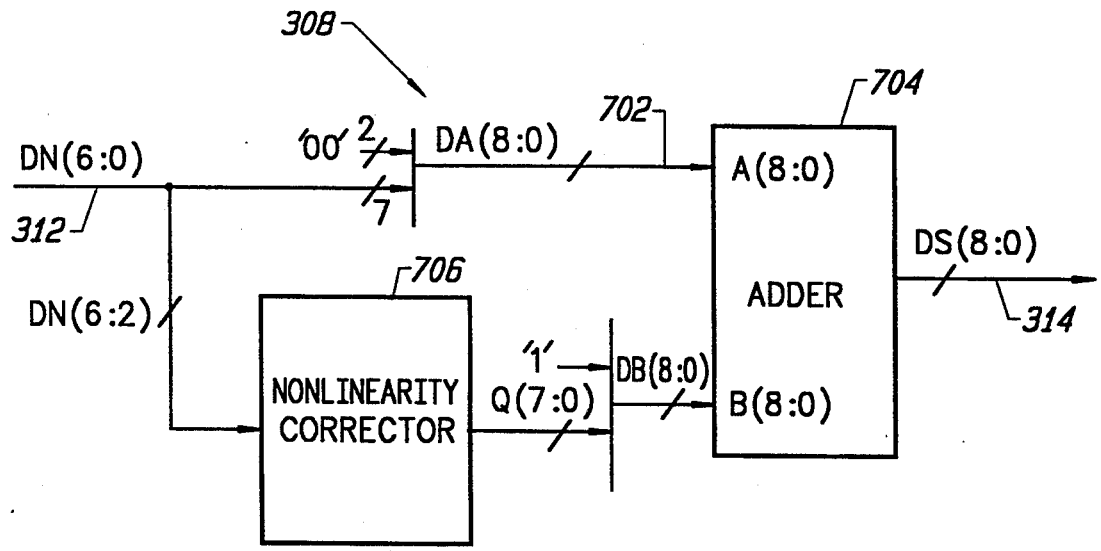
Figure 8A:
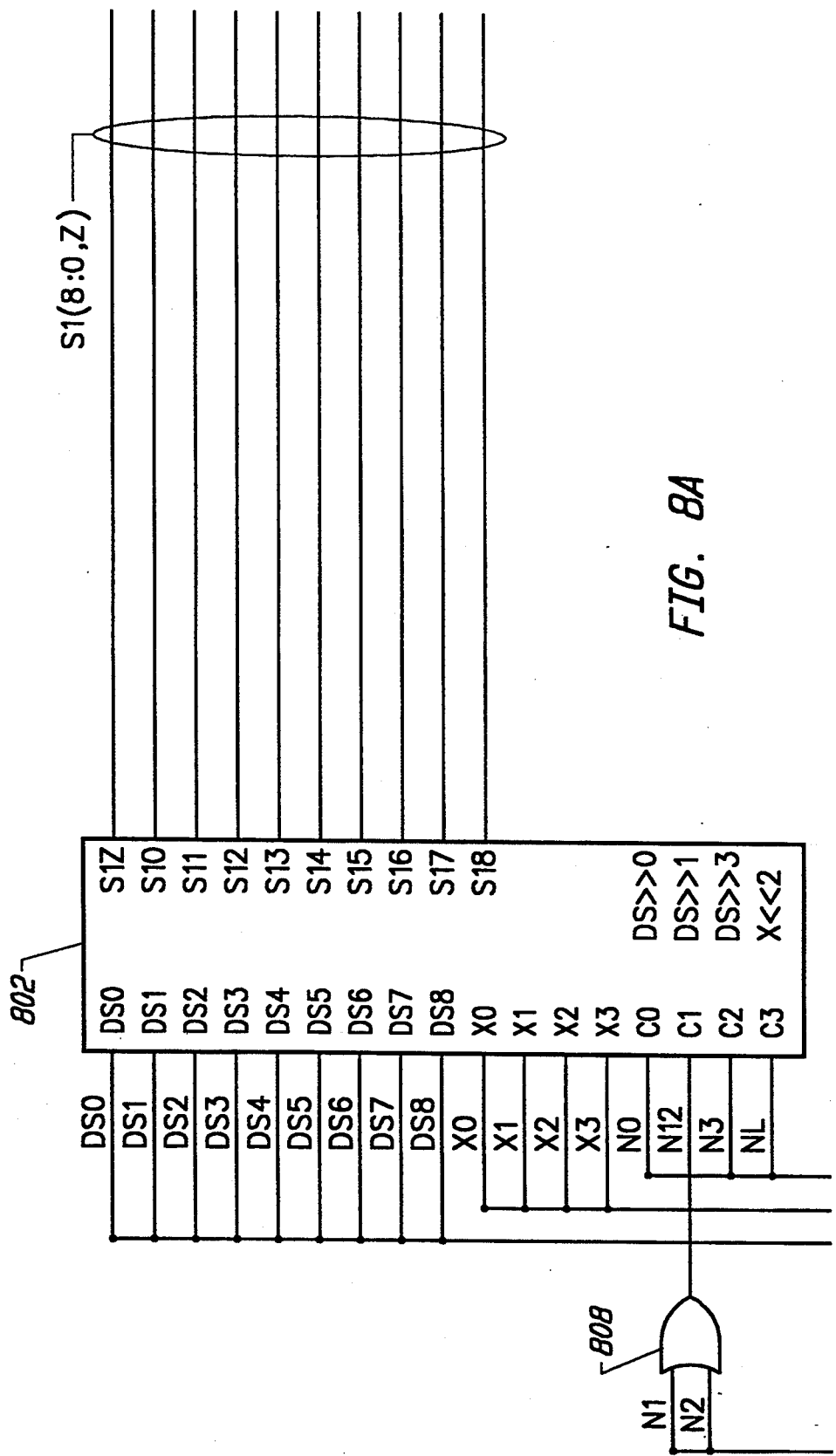
FIG. 8 is a block diagram of the de-mapping circuitry of FIG. 3.
Figure 8B:
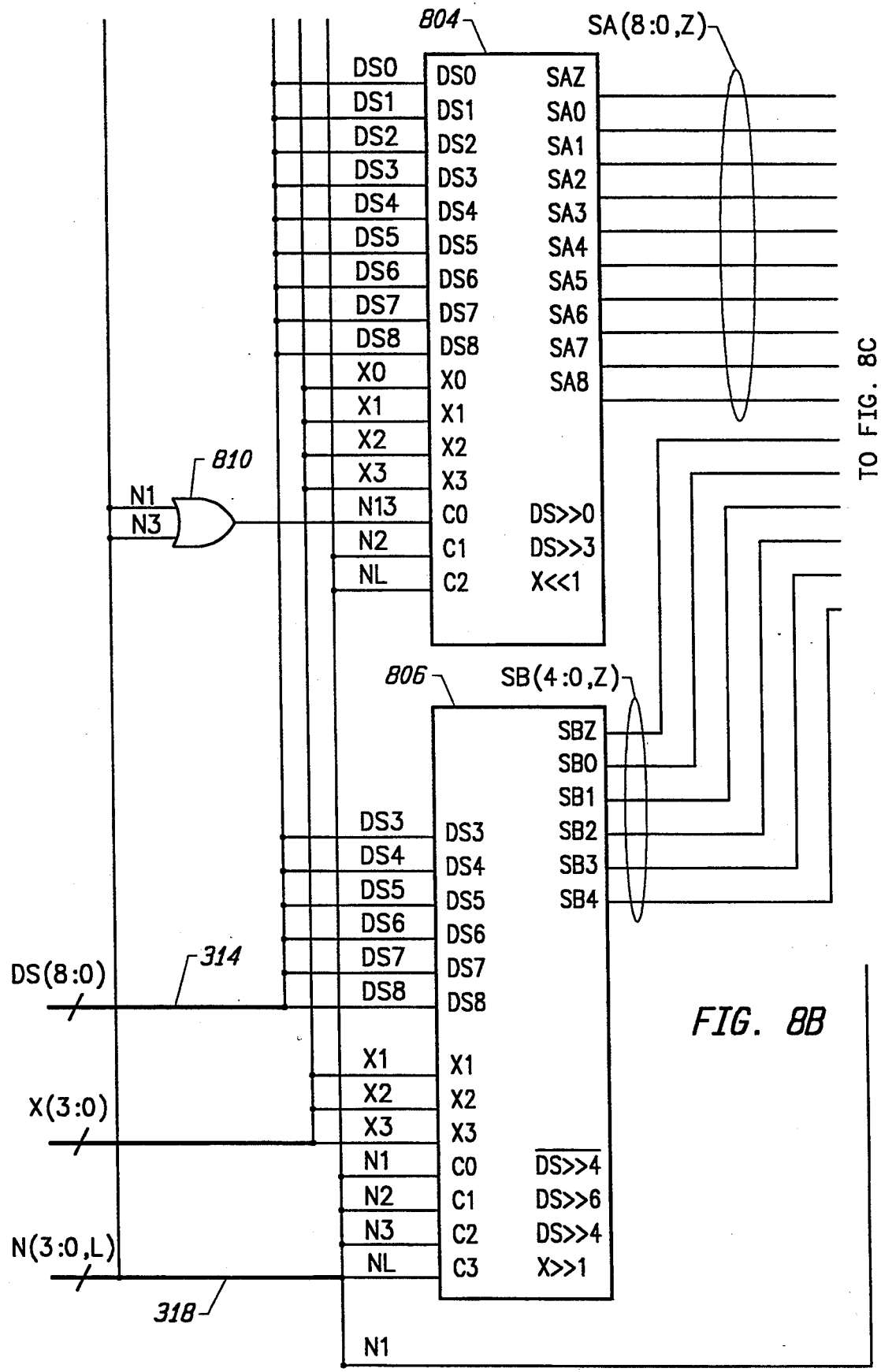
Figure 8C:
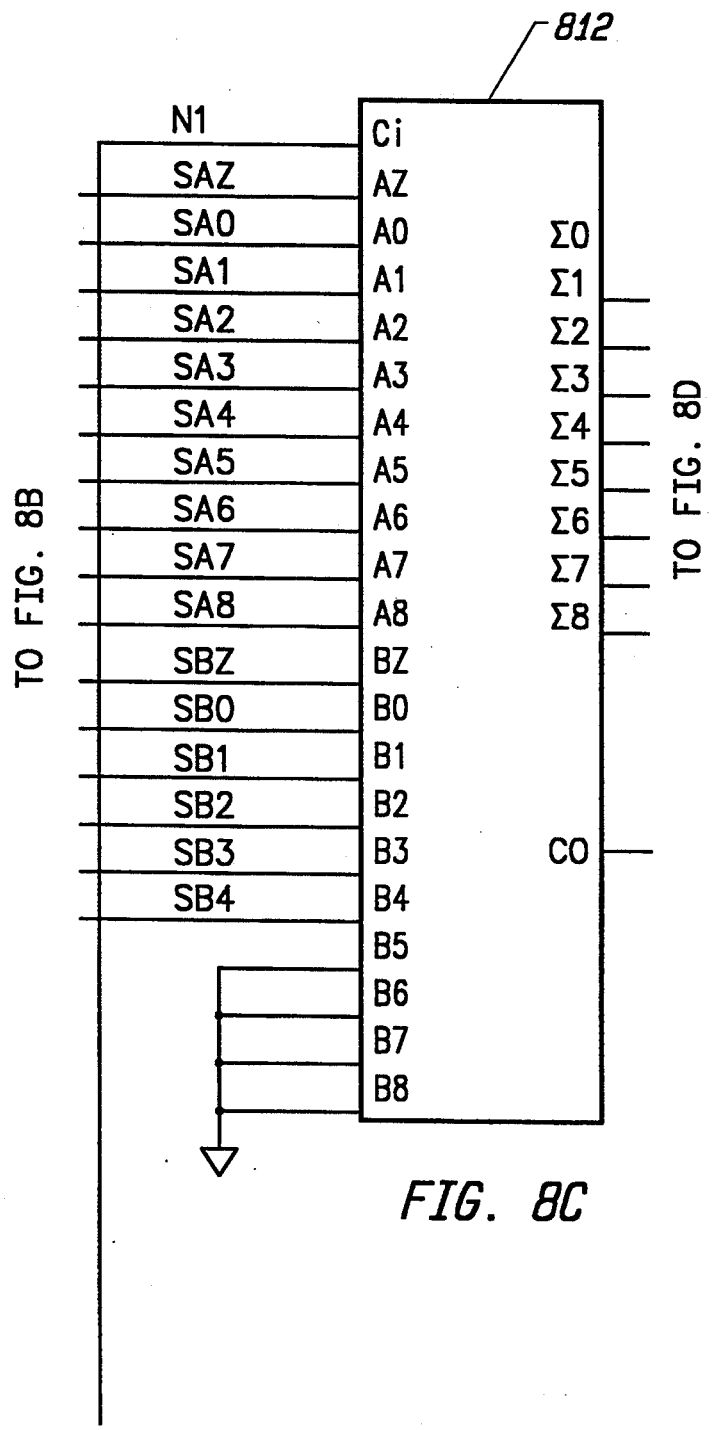
Figure 8D:
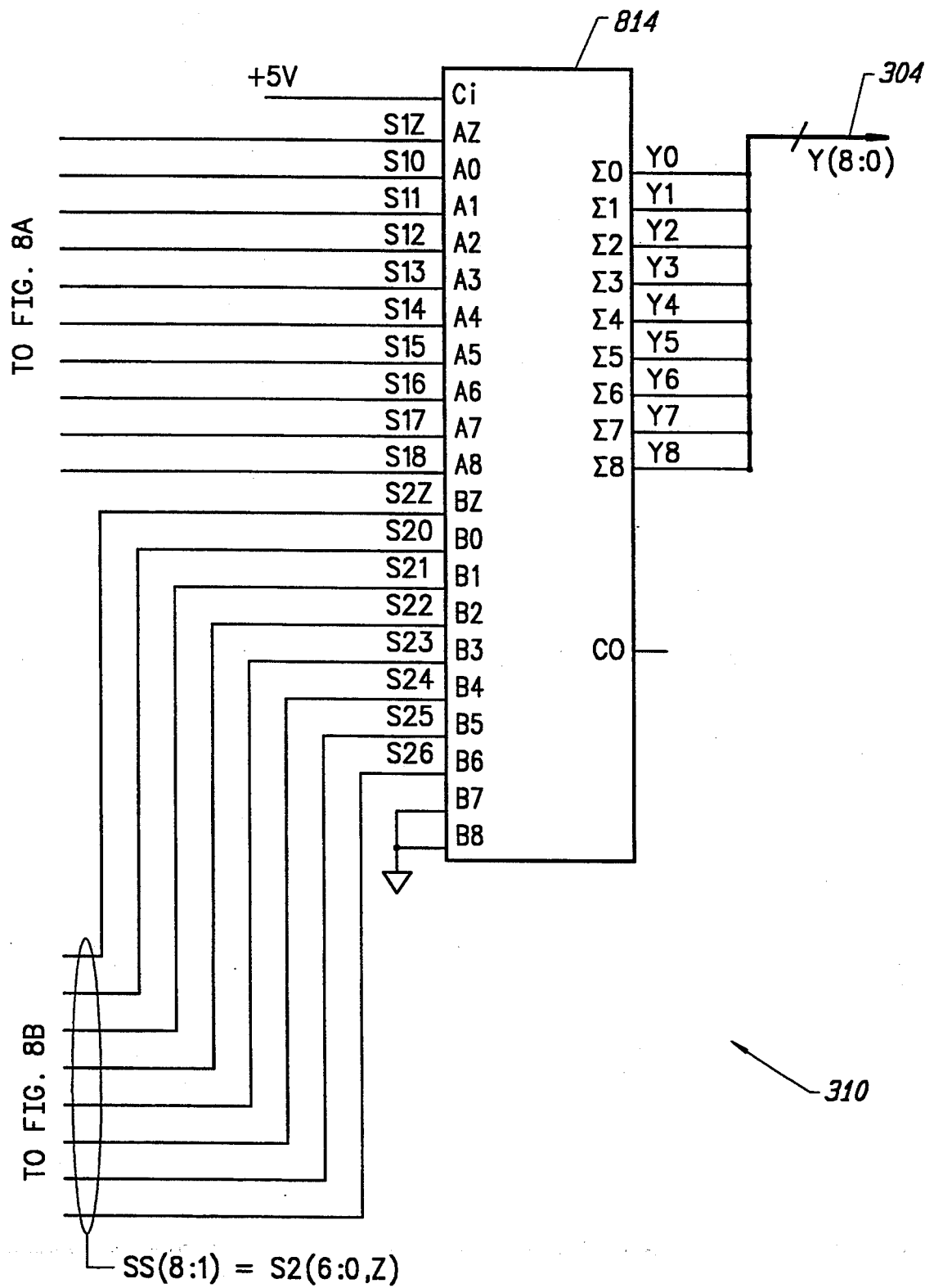

FIG. 7 shows a particularly advantageous implementation for conversion circuitry 308. FIG. 7 uses a slope value of m=128/256. Thus the multiplication circuitry 602 becomes merely a division by two which can be implemented with no hardware at all. That is, the 7-bit DN bus 312 is coupled to the A input of adder 604, but with each wire moved to the next less significant bit of the A input port. The low-order bit DN(0) is preferably not discarded, but rather maintained in the adder 604 to provide an additional bit of precision on the DS bus 314 output. The embodiment of FIG. 7 incorporates the b term into FIG. 7's equivalent of correction ROM 606, thereby widening the ROM to eight bits. But the embodiment also reduces the resolution of the correction ROM by a factor of four, leaving only 32 words of eight bits each.

Thus, as shown in FIG. 7, two 0 bits are concatenated as high-order bits to the DN(6:0) bus 312 to provide a 9-bit DA(8:0) bus 702 which is provided to the A input port of a 9-bit, 2-input adder 704. The concatenation of two high-order 0 bits corresponds to a right-shift of the mapped value on the DN bus by one bit, without discarding the low-order bit, and the increase in precision from seven to nine bits of precision.

Bits 6:2 of the DN bus 312 are also provided to a non-linearity corrector 706, which provides an 8-bit output Q(7:0). Non-linearity corrector 706 is analogous to the correction ROM 606 (FIG. 6), but is preferably implemented using combinational logic since the values stored therein are such as to render such an implementation significantly smaller than the equivalent ROM. Table II sets forth the truth table of nonlinearity corrector 706; the primary advantage to a combinational implementation derives from the fact that all the output values in Q(6) are identical to those in both Q(5) and Q(4), and merely complementary to those in Q(7).

TABLE II

| DN(6:2) | | | | | Q(7:0) | | | | | | | |
|---|---|---|---|---|---|---|---|---|---|---|---|---|
| NON-LINEARITY CORRECTOR | | | | | | | | | | | | |
| 0 | 0 | 0 | 0 | 0 | 0 | 1 | 1 | 1 | 1 | 0 | 1 | 1 | 1 |
| 0 | 0 | 0 | 0 | 1 | 0 | 1 | 1 | 1 | 1 | 1 | 0 | 0 | 1 |
| 0 | 0 | 0 | 1 | 0 | 0 | 1 | 1 | 1 | 1 | 1 | 0 | 0 | 1 |
| 0 | 0 | 0 | 1 | 1 | 0 | 1 | 1 | 1 | 1 | 1 | 0 | 1 | 0 |
| 0 | 0 | 1 | 0 | 0 | 0 | 1 | 1 | 1 | 1 | 1 | 0 | 1 | 1 |
| 0 | 0 | 1 | 0 | 1 | 0 | 1 | 1 | 1 | 1 | 1 | 1 | 0 | 0 |
| 0 | 0 | 1 | 1 | 0 | 0 | 1 | 1 | 1 | 1 | 1 | 0 | 1 |
| 0 | 0 | 1 | 1 | 1 | 0 | 1 | 1 | 1 | 1 | 1 | 1 | 0 |
| 0 | 1 | 0 | 0 | 0 | 0 | 1 | 1 | 1 | 1 | 1 | 1 | 0 |
| 0 | 1 | 0 | 0 | 1 | 0 | 1 | 1 | 1 | 1 | 1 | 1 | 1 |
| 0 | 1 | 0 | 1 | 0 | 1 | 0 | 0 | 0 | 0 | 0 | 0 | 0 |
| 0 | 1 | 0 | 1 | 1 | 1 | 0 | 0 | 0 | 0 | 0 | 0 | 0 |
| 0 | 1 | 1 | 0 | 0 | 1 | 0 | 0 | 0 | 0 | 0 | 0 | 1 |
| 0 | 1 | 1 | 0 | 1 | 1 | 0 | 0 | 0 | 0 | 0 | 0 | 1 |
| 0 | 1 | 1 | 1 | 0 | 1 | 0 | 0 | 0 | 0 | 0 | 0 | 1 |
| 0 | 1 | 1 | 1 | 1 | 1 | 0 | 0 | 0 | 0 | 0 | 1 | 0 |
| 1 | 0 | 0 | 0 | 0 | 1 | 0 | 0 | 0 | 0 | 0 | 1 | 0 |
| 1 | 0 | 0 | 0 | 1 | 1 | 0 | 0 | 0 | 0 | 0 | 1 | 0 |
| 1 | 0 | 0 | 1 | 0 | 1 | 0 | 0 | 0 | 0 | 0 | 1 | 0 |
| 1 | 0 | 0 | 1 | 1 | 1 | 0 | 0 | 0 | 0 | 0 | 1 | 0 |
| 1 | 0 | 1 | 0 | 0 | 1 | 0 | 0 | 0 | 0 | 0 | 1 | 0 |
| 1 | 0 | 1 | 0 | 1 | 1 | 0 | 0 | 0 | 0 | 0 | 1 | 0 |
| 1 | 0 | 1 | 1 | 0 | 1 | 0 | 0 | 0 | 0 | 0 | 1 | 0 |
| 1 | 0 | 1 | 1 | 1 | 1 | 0 | 0 | 0 | 0 | 0 | 1 | 0 |
| 1 | 1 | 0 | 0 | 0 | 1 | 0 | 0 | 0 | 0 | 0 | 1 | 0 |
| 1 | 1 | 0 | 0 | 1 | 1 | 0 | 0 | 0 | 0 | 0 | 1 | 0 |

TABLE II-continued

| DN(6:2) | | | | | Q(7:0) | | | | | | | |
|---|---|---|---|---|---|---|---|---|---|---|---|---|
| NON-LINEARITY CORRECTOR | | | | | | | | | | | | |
| 1 | 1 | 0 | 1 | 0 | 1 | 0 | 0 | 0 | 0 | 0 | 1 | 0 |
| 1 | 1 | 0 | 1 | 1 | 1 | 0 | 0 | 0 | 0 | 0 | 1 | 0 |
| 1 | 1 | 1 | 0 | 0 | 1 | 0 | 0 | 0 | 0 | 0 | 0 | 1 |
| 1 | 1 | 1 | 0 | 1 | 1 | 0 | 0 | 0 | 0 | 0 | 0 | 1 |
| 1 | 1 | 1 | 1 | 0 | 1 | 0 | 0 | 0 | 0 | 0 | 0 | 1 |
| 1 | 1 | 1 | 1 | 1 | 1 | 0 | 0 | 0 | 0 | 0 | 0 | 0 |

Q(7:0) is concatenated with a high-order logic 1 to provide a DB(8:0) value to the 9-bit B input port of the adder 704. The adder 704 is conventional, though some simplifications may be possible since the high-order bits of the A and B input values are known and fixed. The implementation of FIG. 7 for conversion circuitry 308 is extremely compact.

The de-mapping circuitry 310 (FIG. 3) performs a mapping of the converted value on the DS bus 314 back to the segment from which the mapped input value derived. According to the invention, because of the ratiometric division of the input value range into input segments, de-mapping involves simply a multiplication of the converted value by a scale factor which depends only on the input value segment. Additionally, if the input segment is the special treatment segment 208, then the converted value on the DS bus 314 is ignored and the input value on the X bus 302 is merely multiplied by 4.6.

Furthermore, the multiplication by the scale factors is implemented using a sparse multiplier involving only a few data selectors and a 3-input adder. In particular, if the input value was already within the standard segment 216 (FIG. 2), then the scale factor is unity. If the input value was within the input segment 14, then the scale factor is given by the ratio of the height of the rectangle bounding segment 214 to the height of the rectangle bounding standard segment 216. That is, the scale factor for input values which were within input value segment 214 is:

$$[y(0.5)-y(0.25)]/[y(1.0)-y(0.5)]=0.732\approx 376/512.$$

Similarly, the scale factor for input values which were in the input value segment 212 is:

$$[y(0.25)-y(0.125)]/[y(1.0)-y(0.5)]=0.536\approx 274/512.$$

Similarly, the scale factor for input values within input value segment 210 is:

$$[y(0.125)-y(0.0625)]/[y(1.0)-y(0.5)]=0.392\approx 200/512.$$

Table III sets forth these scale factors for the various input value segments 210, 212, 214 and 216, together with their preferred sparse implementation in de-mapping circuitry 310. The sparse implementation of the special treatment input segment 208 is also shown and made a part of the sparse multiplier. As shown in FIG. 3, only the low-order four bits of the input value on the X bus 302 are provided to the de-mapping circuitry 310, since they are used only if the input value was within the special treatment input segment 208 and since all higher order bits of X must be zero in order for the input value to be within the special treatment input segment 208.

TABLE III

DE-MAPPING CIRCUITRY

| Input Segment | N(3:0,L) | Scale Factor | Sparse Implementation |
|---|---|---|---|
| 216 | 00010 | 512/512 | Y = DS |
| 214 | 00100 | 376/512 | Y = ($2^8$DS + $2^7$DS − $2^3$DS)/512 |
| 212 | 01000 | 274/512 | Y = ($2^8$DS + $2^4$DS + $2^1$DS)/512 |
| 210 | 10000 | 200/512 | Y = ($2^7$DS + $2^6$DS + $2^3$DS)/512 |
| 208 | 00001 | N/A | Y = ($2^2$X + $2^{-1}$X + $2^{-3}$X) |

FIG. 8 is a block diagram of the sparse multiplier which forms demapping circuitry 310. It comprises three data selectors 802, 804 and 806, each of which have two input ports and a control port. The first input port of each of the data selectors 802, 804 and 806 receives DS and the second input port receives X. Each data selector can select differently shifted (and in one case complemented) versions of its input port values to its output.

In particular, data selector 802 has four control inputs C(3:0). C3 is connected to receive the NL line from N-bus 318, and C2 is connected to receive the N3 line from N-bus 318. C1 is connected to the output of an OR gate 808, the two inputs of which are connected to receive N1 and N2, respectively. The C0 input of data selector 802 is connected to receive the N0 line from N-bus 318. When C0 is asserted, data selector 802 passes DS(8:0) to its output port shifted right by 0 bits, i.e. unchanged. The output port of data selector 802 is 10 bits wide, and drives a bus designated S1(8:0, Z). Bits (8:0) of the S1 bus carry the same binary weight as respectively numbered bits on the DS bus 314 and (to the extent they exist) on X-bus 302. The bit line S1Z has a binary weight equal to half of the weight of bit line S10, and is provided to retain one additional bit of precision that would otherwise be lost as a result of right-shifts of a value on one of the input ports. When C0 is asserted, data selector 802 sets S1Z to 0.

When C1 is asserted, data selector 802 shifts the value on its DS input port to the right by one bit, shifting in a high-order logic 0. That is, S1(7:0, Z) receives DS(8:0), and S18 receives 0. This corresponds to a mapping S1=$2^{-1}$DS. When C2 is asserted, data selector 802 passes to the S1 bus a version of the value on the DS bus 314 shifted right by three bits, shifting in three high-order logic zeroes. That is, S1(5:0, Z) receives DS (8:2), and S1 (8:6) receives logic zeroes. This corresponds to a mapping S1=$2^{-3}$DS. If C3 is asserted, data selector 802 selects to its output port a version of the value on the X bus, shifted left by two bits. That is, S1(5:2) receives X(3:0), and S1(8:6, 1, 0, Z) receives zeroes. This corresponds to a mapping S1=$2^2$X. As mentioned above, only one of the N-bus lines N(3:0,L) can be asserted at a time.

Data selector 804 has a three-bit control port C(2:0). The C2 input is connected to receive NL, and the C1 input is connected to receive N2. The C0 input is connected to the output of an OR gate 810, the two inputs of which are connected to receive N1 and N3. The output port SA of data selector 804 drives a 10-bit wide SA bus, the lines of which are numbered SA (8:0, Z). Values on the SA bus are interpreted in the same manner as those on the S1 bus. When C0 is asserted, data selector 804 passes the value on DS bus 314 to the SA bus unchanged, with SAZ set to zero. This corresponds to a transformation SA=DS. When C1 is asserted, data selector 804 selects a version of the value on the DS bus 314 shifted right by three bits. That is, SA(5:0, Z)=DS(8:2), and SA(8:6, 1, 0, Z)=0. This corresponds to a transformation SA=$2^{-3}$DS. If C2 is asserted, data selector 804 selects the value on the X bus onto the SA bus, shifted left by one bit. That is, SA(4:1) receives X(3:0), and SA(8:5, 0, Z) are set to zero. This corresponds to a transformation SA=$2^1$X.

Data selector 806 has a 4-bit control port C(3:0), which are connected to receive NL, N3, N2 and N1, respectively. The output port SB(4:0, Z) is only six bits wide, since the higher-order bits are always zero for all the shifted data selection options which data selector 806 can perform. Also, the first input port of data selector 806 receives only DS(8:3), since the lower-order bits DS(2:0) are always shifted out and lost. Similarly, X0 is not provided to data selector 806.

If the C0 input of data selector 806 is asserted, data selector 806 inverts DS(8:3) and places them on SB(4:0, Z). Since two's complement negation requires bit-by-bit inversion as well as the addition of one in the lowest-order bit, and the addition of one has not yet been performed, the C0 transformation of data selector 806 corresponds to a transformation SB=$2^{-4}$DS−$2^{-10}$. If C1 is asserted, data selector 806 shifts the value on DS to the right by six bits and places the result on SB. That is, SB(2:0, Z)=DS(8:5), and SB(4:3)=0. This corresponds to a transformation SB=$2^{-6}$DS. If C2 is asserted, data selector 806 shifts the value on DS bus 314 to the right by four bits and places the result on the SB bus. That is, SB(4:0, Z)=DS(8:3). This corresponds to a transformation SB=$2^{-4}$DS. If the C3 input of data selector 806 is asserted, data selector 806 shifts the value on the X-bus to the right by one bit and places the result on the SB bus. That is, SB(2:0)=X(3:1), and SB(4:3, Z)=0. This corresponds to a transformation SB=$2^{-1}$X.

SA(8:0, Z) are connected to respective A(8:0, Z) lines of an A input port of an adder 812. SB(4:0, Z) are similarly connected to respective B (4:0, Z) lines of a B input port of adder 812. B(8:5) of the B input port of adder 812 are connected to receive a logic zero. The carry input Ci of adder 812 is connected to receive N1 which comes in at the same binary weight as the Z bits. Adder 812 has a 9-bit output port SS(8:0) plus carry. Both the carry output and SS0 are ignored. The bits SS(8:0) have the same weight as respectively numbered bits on the SA bus and, to the extent they exist, on the SB bus. SAZ and SBZ are not used to form an SSZ output bit, but they are used to generate a carry signal for higher-order bits generated in the adder 812. As will be seen, the carry input Ci of adder 812 completes the two's complement negation begun in data selector 806 if N1 is active.

The S1(8:0, Z) output lines from data selector 802 are connected to respective A(8:0, Z) lines of an A input port of another adder 814. SS(8:1) are connected to a B input port of adder 814, after being fixedly shifted to the right by two bits. That is, B(6:0, Z) of the adder 814 are connected to a bus S2(6:0, Z), which is the same as SS(8:1). This corresponds to a transformation of S2=$2^{-2}$SS. The B7 and B8 inputs of adder 814 are connected to receive a logic zero, and the carry input Ci of adder 814 is connected to receive a logic one. The adder 814, which is identical to adder 812, produces a 9-bit output which is provided on the Y-bus 304. It also produces a carry output signal which is ignored because it is known in advance that $x^{1/\gamma} \leq 1.0$. It should be noted that since adder 814 produces only nine output bits from a pair of 10-bit inputs (including the Z input bits), adder 814 effectively truncates the low-order (Z) bit from the output. However, since the carry input Ci has the same binary weight as the Z bits, holding the Ci input of adder 814 at a logic 1 effectively converts the truncation into a rounding-off function. Thus, adder 814 performs a transformation Y=S1+S2, rounded to nine bits of precision.

In operation, the input value segment as represented on the N-bus 318 is used to select specific transformations in data selectors 802, 804 and 806, to produce values on buses S1, SA and SB. The values on buses SA and SB are added together by adder 812 and, if N1 is asserted, incremented by one. Since the input segment indicated by N1 is the only segment for which the demapping function requires a subtraction, N1 correctly indicates when adder 812 should increment its result by one to effect two's complement negation. The output of adder 812 is provided on SS bus, which is effectively divided by four as it is renamed S2. Adder 814 adds the value on the S1 bus and the value on the S2 bus, rounds to nine bits of precision, and provides the output of demapping circuitry 310 on Y-bus 304. Table IV sets forth the values on each of the buses in FIG. 8 for each of the possible values of N, thereby illustrating how the output values are arrived at on the Y-bus 304. It can be seen that the functions shown in Table IV for Y-bus 304 are the same as those listed in Table III.

conversion circuitry of FIG. 7, and the results as viewed on a CRT were of similar quality as for conventional gamma correction. Gamma correction is therefore accomplished accurately by the techniques described herein, using far less chip area than was used in conventional implementations for a given level of precision.

As previously mentioned, aspects of the invention can be implemented in software as well as hardware. The following is a C language software listing of a program which calculates gamma corrected values for $\gamma=2.2$, for each possible integer input value between 0 and 255, inclusive. The program includes a routine CalcGamma, which takes the input value (normalized to lie in the range [0.255]) as a parameter and returns the corresponding gamma corrected value (normalized to lie in the range [0.256]). The routine also prints intermediate results produced by the calculations, for the purposes of illustration. It will be understood that the printing of intermediate results can be omitted in a practical embodiment. The routine itself basically tracks the hardware embodiment described above. In an actual implementation, the CalcGamma routine can be modified in a manner apparent to a person of ordinary skill to omit outputting of intermediate results, and then compiled for execution on a microprocessor which would replace gamma correction unit 106 in the system of

TABLE IV

| N | S1 | SA | SB | SS = SA + SB + $2^{-10}$N1 | S2 = $2^{-2}$SS | Y = S1 + S2 (rounded) |
|---|---|---|---|---|---|---|
| N0 | DS | 0 | 0 | 0 | 0 | DS |
| N1 | $2^{-1}$DS | DS | $(-2^{-4}DS - 2^{-10})$ | $(DS - 2^{-4}DS - 2^{-10} + 2^{-10})$ $= (1 - 2^{-4})DS$ | $(2^{-2} - 2^{-6})DS$ | $(2^{-1} + 2^{-2} - 2^{-6})DS$ $= 0.734375DS$ |
| N2 | $2^{-1}$DS | $2^{-3}$DS | $2^{-6}$DS | $(2^{-3} + 2^{-6})DS$ | $(2^{-5} + 2^{-8})DS$ | $(2^{-1} + 2^{-5} + 2^{-8})DS$ $= 0.535156DS$ |
| N3 | $2^{-3}$DS | DS | $2^{-4}$DS | $(1 + 2^{-4})DS$ | $(2^{-2} + 2^{-6})DS$ | $(2^{-2} + 2^{-3} + 2^{-6})DS$ $= 0.390625DS$ |
| NL | $S^2X$ | $2^1X$ | $2^{-1}X$ | $(2^1 + 2^{-1})X$ | $(2^{-1} + 2^{-3})X$ | $(2^2 + 2^{-1} + 2^{-3})X$ $= 4.625X$ |

Actual images have been passed through an integrated circuit version of the circuit of FIG. 3, using the

FIG. 1.

```
/* a C language routine to calculate a gamma corrected dat value           */
/* passed parameter is input data, return value is gamma corrected data    */
/* By David Main, 181 Oak Knoll Dr. Boulder Creek, CA., May 17, 1993       */
/* Copyright © 1993 The 3DO Company - All rights reserved                  */
/* ***********************************************************************/
/*         Defines, Declarations, Includes, and Function Prototypes        */
#include <stdio.h>
#include <stdlib.h>
#include <conio.h>
#include <math.h>
#define uchar unsigned char              /* abreviate reserved word syntax */
#define uint unsigned int                /* abreviate reserved word syntax */
#define Gamma 2.2                   /* define the gamma value being corrected for */
float GamCor                                    ;/* gamma correction factor */
float Kgamma                          ;/* true gamma correction calculation factor */
uint Data                                                   ;/* data variable */
uchar CalcGamma(uchar Input_Value)             ;/* gamma correction function */
/* ***********************************************************************/
/* ***            START OF PROGRAM EXECUTION                          *** */
int main() {
    printf("\nGamma Corrector Method Demonstration Program\
\nBy David Main for The 3DO Company. Boulder Creek, CA. May 18, 1993.\
\nAll rights reserved.\n\n");
    GamCor = 1/Gamma                ;/* calculate the reciprocal correction factor */
    Kgamma = 256.0 * pow(256,-GamCor)       ;/* true gamma correct value factor */
    /* data format header line #1 */
    printf(" \
\ nInput \ t Shift \ tMapped \ tLinear \ tSub- \ tNon- \ tStd \ tOutput \ tTrue \ tCalc");
```

-continued

```
/* data format header line #2 */
    printf("
        nData  t Bits  tData  tTerm  tSeg  tLinear  tSeg  tData  tValue  tError");
    for (Data = 0 ; Data < 256 ; Data + + )
        CalcGamma(Data) ;
    printf(" nEnd of Demonstration  n") ;
    return(0) ;
}
/* ************************************************************************ */
/* Receive source data value. Return with gamma corrected value. Data is in  */
/* the range of 0X00 through 0XFF (0 through 255). The function performed    */
/* is:                                                                       */
/*              Return_value = Input_Value   GamCor                          */
/*                                                                           */
/* where "GamCor" is the gamma correction factor.                            */
uchar CalcGamma(uchar Input_Value) {
uchar Mapped_Value                  ;/* declare input value mapped to standard segment */
uchar n                             ;/* binary power factor to map input data into standard segment */
uint Linear                         ;/* linear approximation term in standard segment */
uint Non_Linear                     ;/* non-linear approximation term in standard segment */
uint Sub_Segment                    ;/* non-linear approximation sub-segment */
uint Standard_Seg                   ;/* standard segment calculated value */
uint Output_Value                   ;/* gamma corrected output value */
uint Real_Value                     ;/* theoretical true gamma corrected value */
/* ***        MAP THE INPUT DATA INTO THE STANDARD SEGMENT             *** */
    Mapped_Value = Input_Value          ;/* keep input data. Operate on a copy of it */
    printf(" n%u",Input_Value)          ;/* report source data to console */
    if (Mapped_Value & 0XF0)              /* do mapping if input 4 MSB's are not all 0 */
        for ( n = 0 ; (Mapped_Value & 0X80) = = 0 ; n + +)       /* loop to find "n" */
            Mapped_Value = Mapped_Value < < 1      ;/* shift up one bit */
    else
        n = 4                           ;/* flag linear function approximation segment */
    Mapped_Value = Mapped_Value & 0X7F  ;/* be gone, a-priori MSB always 1 */
    printf(" t%u",n)                    ;/* report mapping shift count to console */
    printf(" t%u",Mapped_Value)         ;/* report mapped data value to console */
/* **     CALCULATE THE LINEAR AND NON-LINEAR APPROXIMATION TERMS       ** */
    Linear = Mapped_Value < < 0         ;/* normalize from 8 to 10 bits & divide by 2 */
    printf(" t%d",Linear)               ;/* report linear approximation term to console */
/*          The non-linear approximation is performed by dividing the curve
            in the standard segment into 32 equal sub-segments, each of
            which is given a non-linear correction value by table lookup. The
            approximation sub-segment is conveniently determined by
            shifting the Mapped_Value right by two bits.                     */
    Sub_Segment = Mapped_Value > > 2    ;/* approximation sub segment */
    printf(" t%d",Sub_Segment)          ;/* report sub-segment to console */
    switch (Sub_Segment) {
        case (0) : Non_Linear = 375 ; break ;
        case (1) : Non_Linear = 376 ; break ;
        case (2) : Non_Linear = 377 ; break ;
        case (3) : Non_Linear = 378 ; break ;
        case (4) : Non_Linear = 379 ; break ;
        case (5) : Non_Linear = 380 ; break ;
        case (6) : Non_Linear = 381 ; break ;
        case (7) : Non_Linear = 382 ; break ;
        case (8) : Non_Linear = 382 ; break ;
        case (9) : Non_Linear = 383 ; break ;
        case (10) : Non_Linear = 384 ; break ;
        case (11) : Non_Linear = 384 ; break ;
        case (12) : Non_Linear = 385 ; break ;
        case (13) : Non_Linear = 385 ; break ;
        case (14) : Non_Linear = 385 ; break ;
        case (15) : Non_Linear = 386 ; break ;
        case (16) : Non_Linear = 386 ; break ;
        case (17) : Non_Linear = 386 ; break ;
        case (18) : Non_Linear = 386 ; break ;
        case (19) : Non_Linear = 386 ; break ;
        case (20) : Non_Linear = 386 ; break ;
        case (21) : Non_Linear = 386 ; break ;
        case (22) : Non_Linear = 386 ; break ;
        case (23) : Non_Linear = 386 ; break ;
        case (24) : Non_Linear = 386 ; break ;
        case (25) : Non_Linear = 386 ; break ;
        case (26) : Non_Linear = 386 ; break ;
        case (27) : Non_Linear = 386 ; break ;
        case (28) : Non_Linear = 385 ; break ;
        case (29) : Non_Linear = 385 ; break ;
        case (30) : Non_Linear = 385 ; break ;
        case (31) : Non_Linear = 384 ; break ;
    }
    printf(" t%u",Non_Linear)           ;/* report non-linear term to console */
/* ***       SUM THE LINEAR AND NON-LINEAR APPROXIMATION TERMS        *** */
    Standard_Seg = Linear + Non_Linear  ;/* sum linear and non-linear term */
```

-continued

```
        printf(" t%u",Standard_Seg)              ;/* report standard segment value to console */
/* ***            DE-MAP THE STANDARD SEGMENT VALUE                    *** */
        switch (n) {
            case 0 : Output_Value                 /* input was native to standard segment */
                    = Standard_Seg                ;/* Kdemap = 1.0 */
                    break;
            case 1 : Output_Value                 /* input was native to standard segment - 1 */
                    = (Standard_Seg > > 1)
                    + (Standard_Seg > > 2)
                    - (Standard_Seg > > 6)        ;/* Kdemap = 0.734375 */
                    break;
            case 2 : Output_Value                 /* input was native to standard segment - 2 */
                    = (Standard_Seg > > 1)
                    + (Standard_Seg > > 5)
                    + (Standard_Seg > > 8)        ;/* Kdemap = 0.535156 */
                    break;
            case 3 : Output_Value                 /* input was native to standard segment - 3 */
                    = (Standard_Seg > > 2)
                    + (Standard_Seg > > 3)
                    + (Standard_Seg > > 6)        ;/* Kdemap = 0.390625 */
                    break;
            case 4: Output_Value                  /* input was less than 16 */
                    = (Input_Value < < 3)
                    + (Input_Value > > 0)
                    + (Input_Value > > 2)         ;/* Kdemap = 4.625 */
                    break;
        }
        Output_Value = (Output_Value + 1)/2       ;/* round off, normalize to 8 bits */
        printf(" t%u",Output_Value)               ;/* report gamma corrected data to console */
        Real_Value = ((Kgamma * pow(Input_Value,GamCor)) + 0.5)   ;/* true value */
        printf(" t%d", Real_Value)                ;/* report true value to console */
        printf(" t%d", Output_Value - Real_Value) ;/* report calc err to console */
        return(Output_Value);
}
/* end of demonstration program listing */
```

Table V below is the output of the above computer program. The titles of the columns have been changed to more clearly indicate what they represent, and the output has been re-formatted as table. As can be seen, the calculation error is extremely small, especially for the portion 204 of the gamma correction curve (FIG. 2) which is not linearly approximated. This Table also serves to illustrate the accuracy of the hardware embodiment described with respect to FIGS. 3, 4, 5, 7 and 8.

TABLE V

| | Mapping | | Standard Segment Conversion | | | De-map | Accuracy comparison | |
|---|---|---|---|---|---|---|---|---|
| Input value | Shift bits (N) | Mapped value | Linear term | Aprxn sub-seg | Non-linear term | Total cnvt'd value | Output value | True value | Calc error |
| 0 | 4 | 0 | 0 | 0 | 375 | 375 | 0 | 0 | 0 |
| 1 | 4 | 1 | 1 | 0 | 375 | 376 | 5 | 21 | −16 |
| 2 | 4 | 2 | 2 | 0 | 375 | 377 | 9 | 28 | −19 |
| 3 | 4 | 3 | 3 | 0 | 375 | 378 | 14 | 34 | −20 |
| 4 | 4 | 4 | 4 | 1 | 376 | 380 | 19 | 39 | −20 |
| 5 | 4 | 5 | 5 | 1 | 376 | 381 | 23 | 43 | −20 |
| 6 | 4 | 6 | 6 | 1 | 376 | 382 | 28 | 46 | −18 |
| 7 | 4 | 7 | 7 | 1 | 376 | 383 | 32 | 50 | −18 |
| 8 | 4 | 8 | 8 | 2 | 377 | 385 | 37 | 53 | −16 |
| 9 | 4 | 9 | 9 | 2 | 377 | 386 | 42 | 56 | −14 |
| 10 | 4 | 10 | 10 | 2 | 377 | 387 | 46 | 59 | −13 |
| 11 | 4 | 11 | 11 | 2 | 377 | 388 | 51 | 61 | −10 |
| 12 | 4 | 12 | 12 | 3 | 378 | 390 | 56 | 64 | −8 |
| 13 | 4 | 13 | 13 | 3 | 378 | 391 | 60 | 66 | −6 |
| 14 | 4 | 14 | 14 | 3 | 378 | 392 | 65 | 68 | −3 |
| 15 | 4 | 15 | 15 | 3 | 378 | 393 | 69 | 70 | −1 |
| 16 | 3 | 0 | 0 | 0 | 375 | 375 | 72 | 73 | −1 |
| 17 | 3 | 8 | 8 | 2 | 377 | 385 | 75 | 75 | 0 |
| 18 | 3 | 16 | 16 | 4 | 379 | 395 | 77 | 77 | 0 |
| 19 | 3 | 24 | 24 | 6 | 381 | 405 | 79 | 78 | 1 |
| 20 | 3 | 32 | 32 | 8 | 382 | 414 | 80 | 80 | 0 |
| 21 | 3 | 40 | 40 | 10 | 384 | 424 | 83 | 82 | 1 |
| 22 | 3 | 48 | 48 | 12 | 385 | 433 | 84 | 84 | 0 |
| 23 | 3 | 56 | 56 | 14 | 385 | 441 | 86 | 86 | 0 |
| 24 | 3 | 64 | 64 | 16 | 386 | 450 | 88 | 87 | 1 |
| 25 | 3 | 72 | 72 | 18 | 386 | 458 | 89 | 89 | 0 |
| 26 | 3 | 80 | 80 | 20 | 386 | 466 | 91 | 91 | 0 |
| 27 | 3 | 88 | 88 | 22 | 386 | 474 | 92 | 92 | 0 |
| 28 | 3 | 96 | 96 | 24 | 386 | 482 | 94 | 94 | 0 |
| 29 | 3 | 104 | 104 | 26 | 386 | 490 | 95 | 95 | 0 |
| 30 | 3 | 112 | 112 | 28 | 385 | 497 | 97 | 97 | 0 |
| 31 | 3 | 120 | 120 | 30 | 385 | 505 | 98 | 98 | 0 |

TABLE V-continued

| | Mapping | | Standard Segment Conversion | | | De-map | Accuracy comparison | |
|---|---|---|---|---|---|---|---|---|
| Input value | Shift bits (N) | Mapped value | Linear term | Aprxn sub-seg | Non-linear term | Total cnvt'd value | Output value | True value | Calc error |
| 32 | 2 | 0 | 0 | 0 | 375 | 375 | 100 | 99 | 1 |
| 33 | 2 | 4 | 4 | 1 | 376 | 380 | 101 | 101 | 0 |
| 34 | 2 | 8 | 8 | 2 | 377 | 385 | 103 | 102 | 1 |
| 35 | 2 | 12 | 12 | 3 | 378 | 390 | 104 | 104 | 0 |
| 36 | 2 | 16 | 16 | 4 | 379 | 395 | 105 | 105 | 0 |
| 37 | 2 | 20 | 20 | 5 | 380 | 400 | 107 | 106 | 1 |
| 38 | 2 | 24 | 24 | 6 | 381 | 405 | 108 | 108 | 0 |
| 39 | 2 | 28 | 28 | 7 | 382 | 410 | 109 | 109 | 0 |
| 40 | 2 | 32 | 32 | 8 | 382 | 414 | 110 | 110 | 0 |
| 41 | 2 | 36 | 36 | 9 | 383 | 419 | 112 | 111 | 1 |
| 42 | 2 | 40 | 40 | 10 | 384 | 424 | 113 | 113 | 0 |
| 43 | 2 | 44 | 44 | 11 | 384 | 428 | 114 | 114 | 0 |
| 44 | 2 | 48 | 48 | 12 | 385 | 433 | 115 | 115 | 0 |
| 45 | 2 | 52 | 52 | 13 | 385 | 437 | 116 | 116 | 0 |
| 46 | 2 | 56 | 56 | 14 | 385 | 441 | 117 | 117 | 0 |
| 47 | 2 | 60 | 60 | 15 | 386 | 446 | 119 | 118 | 1 |
| 48 | 2 | 64 | 64 | 16 | 386 | 450 | 120 | 120 | 0 |
| 49 | 2 | 68 | 68 | 17 | 386 | 454 | 121 | 121 | 0 |
| 50 | 2 | 72 | 72 | 18 | 386 | 458 | 122 | 122 | 0 |
| 51 | 2 | 76 | 76 | 19 | 386 | 462 | 123 | 123 | 0 |
| 52 | 2 | 80 | 80 | 20 | 386 | 466 | 124 | 124 | 0 |
| 53 | 2 | 84 | 84 | 21 | 386 | 470 | 125 | 125 | 0 |
| 54 | 2 | 88 | 88 | 22 | 386 | 474 | 126 | 126 | 0 |
| 55 | 2 | 92 | 92 | 23 | 386 | 478 | 127 | 127 | 0 |
| 56 | 2 | 96 | 96 | 24 | 386 | 482 | 129 | 128 | 1 |
| 57 | 2 | 100 | 100 | 25 | 386 | 486 | 130 | 129 | 1 |
| 58 | 2 | 104 | 104 | 26 | 386 | 490 | 131 | 130 | 1 |
| 59 | 2 | 108 | 108 | 27 | 386 | 494 | 132 | 131 | 1 |
| 60 | 2 | 112 | 112 | 28 | 385 | 497 | 132 | 132 | 0 |
| 61 | 2 | 116 | 116 | 29 | 385 | 501 | 133 | 133 | 0 |
| 62 | 2 | 120 | 120 | 30 | 385 | 505 | 134 | 134 | 0 |
| 63 | 2 | 124 | 124 | 31 | 384 | 508 | 135 | 135 | 0 |
| 64 | 1 | 0 | 0 | 0 | 375 | 375 | 138 | 136 | 2 |
| 65 | 1 | 2 | 2 | 0 | 375 | 377 | 139 | 137 | 2 |
| 66 | 1 | 4 | 4 | 1 | 376 | 380 | 140 | 138 | 2 |
| 67 | 1 | 6 | 6 | 1 | 376 | 382 | 141 | 139 | 2 |
| 68 | 1 | 8 | 8 | 2 | 377 | 385 | 141 | 140 | 1 |
| 69 | 1 | 10 | 10 | 2 | 377 | 387 | 142 | 141 | 1 |
| 70 | 1 | 12 | 12 | 3 | 378 | 390 | 143 | 142 | 1 |
| 71 | 1 | 14 | 14 | 3 | 378 | 392 | 144 | 143 | 1 |
| 72 | 1 | 16 | 16 | 4 | 379 | 395 | 145 | 144 | 1 |
| 73 | 1 | 18 | 18 | 4 | 379 | 397 | 146 | 145 | 1 |
| 74 | 1 | 20 | 20 | 5 | 380 | 400 | 147 | 146 | 1 |
| 75 | 1 | 22 | 22 | 5 | 380 | 402 | 148 | 147 | 1 |
| 76 | 1 | 24 | 24 | 6 | 381 | 405 | 149 | 147 | 2 |
| 77 | 1 | 26 | 26 | 6 | 381 | 407 | 149 | 148 | 1 |
| 78 | 1 | 28 | 28 | 7 | 382 | 410 | 151 | 149 | 2 |
| 79 | 1 | 30 | 30 | 7 | 382 | 412 | 152 | 150 | 2 |
| 80 | 1 | 32 | 32 | 8 | 382 | 414 | 152 | 151 | 1 |
| 81 | 1 | 34 | 34 | 8 | 382 | 416 | 153 | 152 | 1 |
| 82 | 1 | 36 | 36 | 9 | 383 | 419 | 154 | 153 | 1 |
| 83 | 1 | 38 | 38 | 9 | 383 | 421 | 155 | 153 | 2 |
| 84 | 1 | 40 | 40 | 10 | 384 | 424 | 156 | 154 | 2 |
| 85 | 1 | 42 | 42 | 10 | 384 | 426 | 157 | 155 | 2 |
| 86 | 1 | 44 | 44 | 11 | 384 | 428 | 158 | 156 | 2 |
| 87 | 1 | 46 | 46 | 11 | 384 | 430 | 158 | 157 | 1 |
| 88 | 1 | 48 | 48 | 12 | 385 | 433 | 159 | 158 | 1 |
| 89 | 1 | 50 | 50 | 12 | 385 | 435 | 160 | 158 | 2 |
| 90 | 1 | 52 | 52 | 13 | 385 | 437 | 161 | 159 | 2 |
| 91 | 1 | 54 | 54 | 13 | 385 | 439 | 161 | 160 | 1 |
| 92 | 1 | 56 | 56 | 14 | 385 | 441 | 162 | 161 | 1 |
| 93 | 1 | 58 | 58 | 14 | 385 | 443 | 163 | 162 | 1 |
| 94 | 1 | 60 | 60 | 15 | 386 | 446 | 164 | 162 | 2 |
| 95 | 1 | 62 | 62 | 15 | 386 | 448 | 165 | 163 | 2 |
| 96 | 1 | 64 | 64 | 16 | 386 | 450 | 165 | 164 | 1 |
| 97 | 1 | 66 | 66 | 16 | 386 | 452 | 166 | 165 | 1 |
| 98 | 1 | 68 | 68 | 17 | 386 | 454 | 167 | 165 | 2 |
| 99 | 1 | 70 | 70 | 17 | 386 | 456 | 168 | 166 | 2 |
| 100 | 1 | 72 | 72 | 18 | 386 | 458 | 168 | 167 | 1 |
| 101 | 1 | 74 | 74 | 18 | 386 | 460 | 169 | 168 | 1 |
| 102 | 1 | 76 | 76 | 19 | 386 | 462 | 170 | 168 | 2 |
| 103 | 1 | 78 | 78 | 19 | 386 | 464 | 171 | 169 | 2 |
| 104 | 1 | 80 | 80 | 20 | 386 | 466 | 171 | 170 | 1 |
| 105 | 1 | 82 | 82 | 20 | 386 | 468 | 172 | 171 | 1 |
| 106 | 1 | 84 | 84 | 21 | 386 | 470 | 173 | 171 | 2 |
| 107 | 1 | 86 | 86 | 21 | 386 | 472 | 174 | 172 | 2 |
| 108 | 1 | 88 | 88 | 22 | 386 | 474 | 174 | 173 | 1 |

TABLE V-continued

| | Mapping | | Standard Segment Conversion | | | | De-map | Accuracy comparison | |
|---|---|---|---|---|---|---|---|---|---|
| Input value | Shift bits (N) | Mapped value | Linear term | Aprxn sub-seg | Non-linear term | Total cnvt'd value | Output value | True value | Calc error |
| 109 | 1 | 90 | 90 | 22 | 386 | 476 | 175 | 174 | 1 |
| 110 | 1 | 92 | 92 | 23 | 386 | 478 | 176 | 174 | 2 |
| 111 | 1 | 94 | 94 | 23 | 386 | 480 | 177 | 175 | 2 |
| 112 | 1 | 96 | 96 | 24 | 386 | 482 | 177 | 176 | 1 |
| 113 | 1 | 98 | 98 | 24 | 386 | 484 | 178 | 177 | 1 |
| 114 | 1 | 100 | 100 | 25 | 386 | 486 | 179 | 177 | 2 |
| 115 | 1 | 102 | 102 | 25 | 386 | 488 | 180 | 178 | 2 |
| 116 | 1 | 104 | 104 | 26 | 386 | 490 | 180 | 179 | 1 |
| 117 | 1 | 106 | 106 | 26 | 386 | 492 | 181 | 179 | 2 |
| 118 | 1 | 108 | 108 | 27 | 386 | 494 | 182 | 180 | 2 |
| 119 | 1 | 110 | 110 | 27 | 386 | 496 | 183 | 181 | 2 |
| 120 | 1 | 112 | 112 | 28 | 385 | 497 | 183 | 181 | 2 |
| 121 | 1 | 114 | 114 | 28 | 385 | 499 | 183 | 182 | 1 |
| 122 | 1 | 116 | 116 | 29 | 385 | 501 | 184 | 183 | 1 |
| 123 | 1 | 118 | 118 | 29 | 385 | 503 | 185 | 183 | 2 |
| 124 | 1 | 120 | 120 | 30 | 385 | 505 | 186 | 184 | 2 |
| 125 | 1 | 122 | 122 | 30 | 385 | 507 | 186 | 185 | 1 |
| 126 | 1 | 124 | 124 | 31 | 384 | 508 | 187 | 185 | 2 |
| 127 | 1 | 126 | 126 | 31 | 384 | 510 | 188 | 186 | 2 |
| 128 | 0 | 0 | 0 | 0 | 375 | 375 | 188 | 187 | 1 |
| 129 | 0 | 1 | 1 | 0 | 375 | 376 | 188 | 187 | 1 |
| 130 | 0 | 2 | 2 | 0 | 375 | 377 | 189 | 188 | 1 |
| 131 | 0 | 3 | 3 | 0 | 375 | 378 | 189 | 189 | 0 |
| 132 | 0 | 4 | 4 | 1 | 376 | 380 | 190 | 189 | 1 |
| 133 | 0 | 5 | 5 | 1 | 376 | 381 | 191 | 190 | 1 |
| 134 | 0 | 6 | 6 | 1 | 376 | 382 | 191 | 191 | 0 |
| 135 | 0 | 7 | 7 | 1 | 376 | 383 | 192 | 191 | 1 |
| 136 | 0 | 8 | 8 | 2 | 377 | 385 | 193 | 192 | 1 |
| 137 | 0 | 9 | 9 | 2 | 377 | 386 | 193 | 193 | 0 |
| 138 | 0 | 10 | 10 | 2 | 377 | 387 | 194 | 193 | 1 |
| 139 | 0 | 11 | 11 | 2 | 377 | 388 | 194 | 194 | 0 |
| 140 | 0 | 12 | 12 | 3 | 378 | 390 | 195 | 195 | 0 |
| 141 | 0 | 13 | 13 | 3 | 378 | 391 | 196 | 195 | 1 |
| 142 | 0 | 14 | 14 | 3 | 378 | 392 | 196 | 196 | 0 |
| 143 | 0 | 15 | 15 | 3 | 378 | 393 | 197 | 196 | 1 |
| 144 | 0 | 16 | 16 | 4 | 379 | 395 | 198 | 197 | 1 |
| 145 | 0 | 17 | 17 | 4 | 379 | 396 | 198 | 198 | 0 |
| 146 | 0 | 18 | 18 | 4 | 379 | 397 | 199 | 198 | 1 |
| 147 | 0 | 19 | 19 | 4 | 379 | 398 | 199 | 199 | 0 |
| 148 | 0 | 20 | 20 | 5 | 380 | 400 | 200 | 200 | 0 |
| 149 | 0 | 21 | 21 | 5 | 380 | 401 | 201 | 200 | 1 |
| 150 | 0 | 22 | 22 | 5 | 380 | 402 | 201 | 201 | 0 |
| 151 | 0 | 23 | 23 | 5 | 380 | 403 | 202 | 201 | 1 |
| 152 | 0 | 24 | 24 | 6 | 381 | 405 | 203 | 202 | 1 |
| 153 | 0 | 25 | 25 | 6 | 381 | 406 | 203 | 203 | 0 |
| 154 | 0 | 26 | 26 | 6 | 381 | 407 | 204 | 203 | 1 |
| 155 | 0 | 27 | 27 | 6 | 381 | 408 | 204 | 204 | 0 |
| 156 | 0 | 28 | 28 | 7 | 382 | 410 | 205 | 204 | 1 |
| 157 | 0 | 29 | 29 | 7 | 382 | 411 | 206 | 205 | 1 |
| 158 | 0 | 30 | 30 | 7 | 382 | 412 | 206 | 206 | 0 |
| 159 | 0 | 31 | 31 | 7 | 382 | 413 | 207 | 206 | 1 |
| 160 | 0 | 32 | 32 | 8 | 382 | 414 | 207 | 207 | 0 |
| 161 | 0 | 33 | 33 | 8 | 382 | 415 | 208 | 207 | 1 |
| 162 | 0 | 34 | 34 | 8 | 382 | 416 | 208 | 208 | 0 |
| 163 | 0 | 35 | 35 | 8 | 382 | 417 | 209 | 209 | 0 |
| 164 | 0 | 36 | 36 | 9 | 383 | 419 | 210 | 209 | 1 |
| 165 | 0 | 37 | 37 | 9 | 383 | 420 | 210 | 210 | 0 |
| 166 | 0 | 38 | 38 | 9 | 383 | 421 | 211 | 210 | 1 |
| 167 | 0 | 39 | 39 | 9 | 383 | 422 | 211 | 211 | 0 |
| 168 | 0 | 40 | 40 | 10 | 384 | 424 | 212 | 211 | 1 |
| 169 | 0 | 41 | 41 | 10 | 384 | 425 | 213 | 212 | 1 |
| 170 | 0 | 42 | 42 | 10 | 384 | 426 | 213 | 213 | 0 |
| 171 | 0 | 43 | 43 | 10 | 384 | 427 | 214 | 213 | 1 |
| 172 | 0 | 44 | 44 | 11 | 384 | 428 | 214 | 214 | 0 |
| 173 | 0 | 45 | 45 | 11 | 384 | 429 | 215 | 214 | 1 |
| 174 | 0 | 46 | 46 | 11 | 384 | 430 | 215 | 215 | 0 |
| 175 | 0 | 47 | 47 | 11 | 384 | 431 | 216 | 215 | 1 |
| 176 | 0 | 48 | 48 | 12 | 385 | 433 | 217 | 216 | 1 |
| 177 | 0 | 49 | 49 | 12 | 385 | 434 | 217 | 216 | 1 |
| 178 | 0 | 50 | 50 | 12 | 385 | 435 | 218 | 217 | 1 |
| 179 | 0 | 51 | 51 | 12 | 385 | 436 | 218 | 218 | 0 |
| 180 | 0 | 52 | 52 | 13 | 385 | 437 | 219 | 218 | 1 |
| 181 | 0 | 53 | 53 | 13 | 385 | 438 | 219 | 219 | 0 |
| 182 | 0 | 54 | 54 | 13 | 385 | 439 | 220 | 219 | 1 |
| 183 | 0 | 55 | 55 | 13 | 385 | 440 | 220 | 220 | 0 |
| 184 | 0 | 56 | 56 | 14 | 385 | 441 | 221 | 220 | 1 |
| 185 | 0 | 57 | 57 | 14 | 385 | 442 | 221 | 221 | 0 |

TABLE V-continued

| Input value | Mapping | | Standard Segment Conversion | | | De-map Output value | Accuracy comparison | |
|---|---|---|---|---|---|---|---|---|
| | Shift bits (N) | Mapped value | Linear term | Aprxn sub-seg | Non-linear term | Total cnvt'd value | | True value | Calc error |
| 186 | 0 | 58 | 58 | 14 | 385 | 443 | 222 | 221 | 1 |
| 187 | 0 | 59 | 59 | 14 | 385 | 444 | 222 | 222 | 0 |
| 188 | 0 | 60 | 60 | 15 | 386 | 446 | 223 | 222 | 1 |
| 189 | 0 | 61 | 61 | 15 | 386 | 447 | 224 | 223 | 1 |
| 190 | 0 | 62 | 62 | 15 | 386 | 448 | 224 | 224 | 0 |
| 191 | 0 | 63 | 63 | 15 | 386 | 449 | 225 | 224 | 1 |
| 192 | 0 | 64 | 64 | 16 | 386 | 450 | 225 | 225 | 0 |
| 193 | 0 | 65 | 65 | 16 | 386 | 451 | 226 | 225 | 1 |
| 194 | 0 | 66 | 66 | 16 | 386 | 452 | 226 | 226 | 0 |
| 195 | 0 | 67 | 67 | 16 | 386 | 453 | 227 | 226 | 1 |
| 196 | 0 | 68 | 68 | 17 | 386 | 454 | 227 | 227 | 0 |
| 197 | 0 | 69 | 69 | 17 | 386 | 455 | 228 | 227 | 1 |
| 198 | 0 | 70 | 70 | 17 | 386 | 456 | 228 | 228 | 0 |
| 199 | 0 | 71 | 71 | 17 | 386 | 457 | 229 | 228 | 1 |
| 200 | 0 | 72 | 72 | 18 | 386 | 458 | 229 | 229 | 0 |
| 201 | 0 | 73 | 73 | 18 | 386 | 459 | 230 | 229 | 1 |
| 202 | 0 | 74 | 74 | 18 | 386 | 460 | 230 | 230 | 0 |
| 203 | 0 | 75 | 75 | 18 | 386 | 461 | 231 | 230 | 1 |
| 204 | 0 | 76 | 76 | 19 | 386 | 462 | 231 | 231 | 0 |
| 205 | 0 | 77 | 77 | 19 | 386 | 463 | 232 | 231 | 1 |
| 206 | 0 | 78 | 78 | 19 | 386 | 464 | 232 | 232 | 0 |
| 207 | 0 | 79 | 79 | 19 | 386 | 465 | 233 | 232 | 1 |
| 208 | 0 | 80 | 80 | 20 | 386 | 466 | 233 | 233 | 0 |
| 209 | 0 | 81 | 81 | 20 | 386 | 467 | 234 | 233 | 1 |
| 210 | 0 | 82 | 82 | 20 | 386 | 468 | 234 | 234 | 0 |
| 211 | 0 | 83 | 83 | 20 | 386 | 469 | 235 | 234 | 1 |
| 212 | 0 | 84 | 84 | 21 | 386 | 470 | 235 | 235 | 0 |
| 213 | 0 | 85 | 85 | 21 | 386 | 471 | 236 | 235 | 1 |
| 214 | 0 | 86 | 86 | 21 | 386 | 472 | 236 | 236 | 0 |
| 215 | 0 | 87 | 87 | 21 | 386 | 473 | 237 | 236 | 1 |
| 216 | 0 | 88 | 88 | 22 | 386 | 474 | 237 | 237 | 0 |
| 217 | 0 | 89 | 89 | 22 | 386 | 475 | 238 | 237 | 1 |
| 218 | 0 | 90 | 90 | 22 | 386 | 476 | 238 | 238 | 0 |
| 219 | 0 | 91 | 91 | 22 | 386 | 477 | 239 | 238 | 1 |
| 220 | 0 | 92 | 92 | 23 | 386 | 478 | 239 | 239 | 0 |
| 221 | 0 | 93 | 93 | 23 | 386 | 479 | 240 | 239 | 1 |
| 222 | 0 | 94 | 94 | 23 | 386 | 480 | 240 | 240 | 0 |
| 223 | 0 | 95 | 95 | 23 | 386 | 481 | 241 | 240 | 1 |
| 224 | 0 | 96 | 96 | 24 | 386 | 482 | 241 | 241 | 0 |
| 225 | 0 | 97 | 97 | 24 | 386 | 483 | 242 | 241 | 1 |
| 226 | 0 | 98 | 98 | 24 | 386 | 484 | 242 | 242 | 0 |
| 227 | 0 | 99 | 99 | 24 | 386 | 485 | 243 | 242 | 1 |
| 228 | 0 | 100 | 100 | 25 | 386 | 486 | 243 | 243 | 0 |
| 229 | 0 | 101 | 101 | 25 | 386 | 487 | 244 | 243 | 1 |
| 230 | 0 | 102 | 102 | 25 | 386 | 488 | 244 | 244 | 0 |
| 231 | 0 | 103 | 103 | 25 | 386 | 489 | 245 | 244 | 1 |
| 232 | 0 | 104 | 104 | 26 | 386 | 490 | 245 | 245 | 0 |
| 233 | 0 | 105 | 105 | 26 | 386 | 491 | 246 | 245 | 1 |
| 234 | 0 | 106 | 106 | 26 | 386 | 492 | 246 | 246 | 0 |
| 235 | 0 | 107 | 107 | 26 | 386 | 493 | 247 | 246 | 1 |
| 236 | 0 | 108 | 108 | 27 | 386 | 494 | 247 | 247 | 0 |
| 237 | 0 | 109 | 109 | 27 | 386 | 495 | 248 | 247 | 1 |
| 238 | 0 | 110 | 110 | 27 | 386 | 496 | 248 | 248 | 0 |
| 239 | 0 | 111 | 111 | 27 | 386 | 497 | 249 | 248 | 1 |
| 240 | 0 | 112 | 112 | 28 | 385 | 497 | 249 | 249 | 0 |
| 241 | 0 | 113 | 113 | 28 | 385 | 498 | 249 | 249 | 0 |
| 242 | 0 | 114 | 114 | 28 | 385 | 499 | 250 | 250 | 0 |
| 243 | 0 | 115 | 115 | 28 | 385 | 500 | 250 | 250 | 0 |
| 244 | 0 | 116 | 116 | 29 | 385 | 501 | 251 | 250 | 1 |
| 245 | 0 | 117 | 117 | 29 | 385 | 502 | 251 | 251 | 0 |
| 246 | 0 | 118 | 118 | 29 | 385 | 503 | 252 | 251 | 1 |
| 247 | 0 | 119 | 119 | 29 | 385 | 504 | 252 | 252 | 0 |
| 248 | 0 | 120 | 120 | 30 | 385 | 505 | 253 | 252 | 1 |
| 249 | 0 | 121 | 121 | 30 | 385 | 506 | 253 | 253 | 0 |
| 250 | 0 | 122 | 122 | 30 | 385 | 507 | 254 | 253 | 1 |
| 251 | 0 | 123 | 123 | 30 | 385 | 508 | 254 | 254 | 0 |
| 252 | 0 | 124 | 124 | 31 | 384 | 508 | 254 | 254 | 0 |
| 253 | 0 | 125 | 125 | 31 | 384 | 509 | 255 | 255 | 0 |
| 254 | 0 | 126 | 126 | 31 | 384 | 510 | 255 | 255 | 0 |
| 255 | 0 | 127 | 127 | 31 | 384 | 511 | 256 | 256 | 0 |

Figure 9:
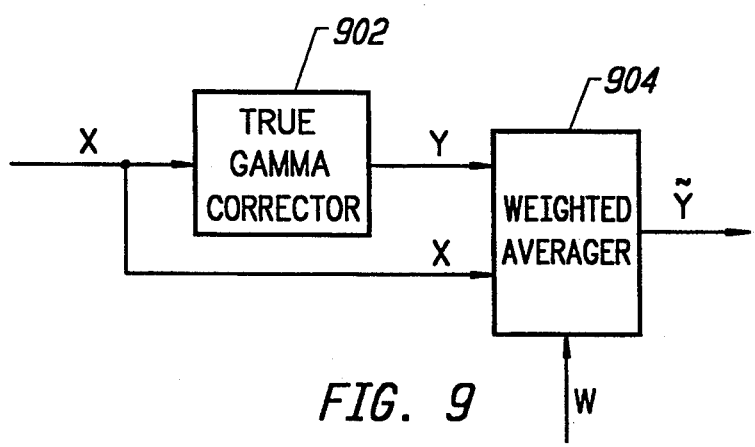
FIG. 9 is a block diagram of another embodiment of the invention.

FIG. 9 is a block diagram illustrating another embodiment of the invention. In the embodiment of FIG. 9, the uncorrected input value X is provided to a true gamma corrector circuit 902, such as that illustrated in FIG. 3. The output Y of the true gamma corrector circuit 902 is provided to one input of a weighted averager 904, the other input of which receives the input value X. A weight signal W is also provided to the weighted averager 904, which produces an overall output signal Y given by $$Y = WY + (1-W)X.$$

W can be provided, for example, by leads on an integrated circuit package which the user can tie to fixed signal levels, or can be provided by a register which other circuitry can program with a desired value.

In one embodiment, W can only take on the values W=0 and W=1, in which case the weighted averager 904 degenerates simply to a data selector. In another embodiment, W can take on any value between 0 and 1, inclusive, in steps of $\frac{1}{8}$. This arrangement permits easy implementation of the weighted averager 904 while affording a large variety of approximated correction functions.

Figure 10:
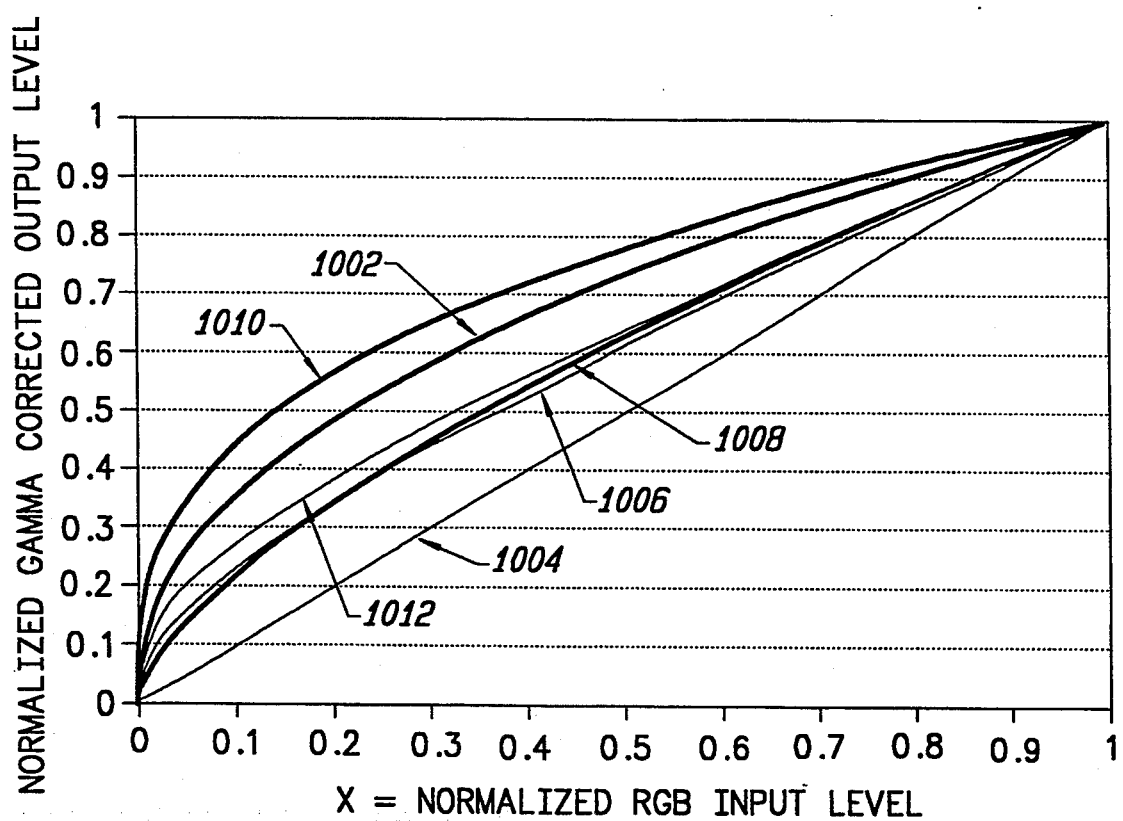
FIGS. 10 and 11 are plots useful for explaining FIG. 9.

FIG. 10 is a computer generated plot illustrating the effectiveness of the embodiment of FIG. 9 in approximating an intermediate gamma correction value $\gamma = 1.5$, using $W = \frac{1}{2}$, and using either of two different true gamma correctors 902 (one implementing $y = x^{1/2.2}$ and one implementing $y = x^{1/2.8}$). In particular, curve 1002 represents a true gamma correction function for $\gamma = 2.2$, and curve 1004 represents the uncorrected input value X. Curve 1006 represents the weighted average function Y, where $W = \frac{1}{2}$. That is, for curve 1006, $$Y = (X^{1/2.2} + X)/2.$$

It can be seen that curve 1006 closely approximates curve 1008, which is the true gamma correction function for $\gamma = 1.5$, an intermediate value of $\gamma$. Similarly, curve 1010 represents a true gamma correction function for $\gamma = 2.8$, and curve 1012 represents the weighted average function $$Y = (X^{1/2.8} + X)/2.$$

It can be seen that curve 1012 is not as good as curve 1006 at approximating the true gamma correction function for $\gamma = 1.5$, but it is still a relatively good approximation.

Figure 11:
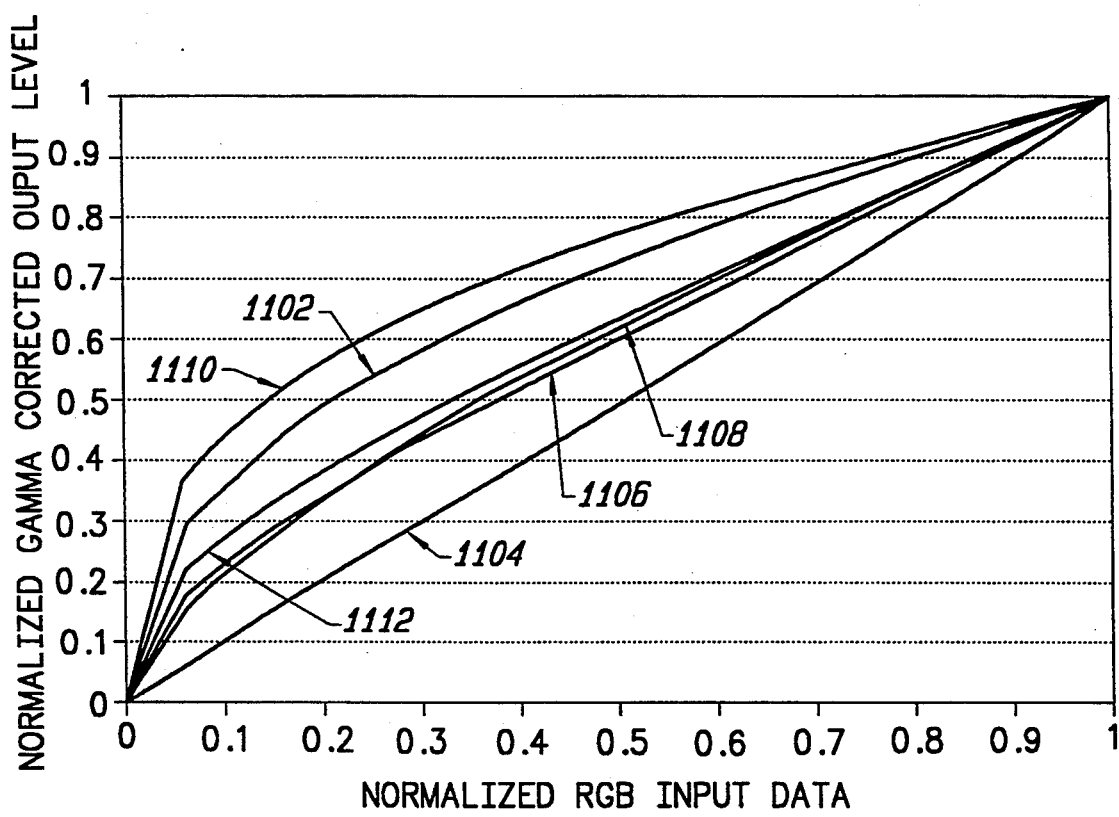

FIG. 11 is a computer-generated plot illustrating the same results as FIG. 10, except that the true gamma correctors 902 approximate the low-order 1/16 of the input compliance range with straight lines (see portion 206 in the plot of FIG. 2). As in FIG. 10, curve 1102 represents the gamma-corrected output for $\gamma = 2.2$; curve 1104 represents the uncorrected input value X; and curve 1106 represents the weighted average function Y, where $W = \frac{1}{2}$. It can be seen that curve 1106 closely approximates curve 1108, which is the gamma-corrected output for $\gamma = 1.5$. Similarly, curve 1110 represents the gamma corrected output for $\gamma = 2.8$, and curve 1112 represents the weighted average function $$Y = (X^{1/2.8} + X)/2.$$

Curve 1112 is a relatively good approximation of the gamma corrected output curve for $\gamma = 1.5$.

Note that apparatus can also be designed in which choices are made available for W which are outside the range of [0,1], to thereby further extend the flexibility of the device. Apparatus can be designed also in which the function implemented by the 3-step circuitry does not exactly match any power law function, an exact (or more nearly exact) match being achieved only when an intermediate value is selected for W.

The invention has been described with respect to particular embodiments thereof, and it will be understood that numerous modifications can be made without departing from the scope of the invention. For example, it can also be used to gamma correct the luminosity of a black and white signal.

I claim:

1. A method for producing physical signals representing an approximation of a desired transfer function of an input value which is included within a predefined portion of a predefined input value range, said transfer function exhibiting a self-similarity characteristic, comprising the steps of:

dividing said portion of said input value range into a plurality of segments, one of said segments being a standard segment, and one of said segments including said input value and being an input value segment;

processing input physical signals representing said input value to produce mapped physical signals, said mapped physical signals representing a mapped value being a mapped version of said input value from said input value segment to said standard segment;

processing said mapped physical signals to produce converted physical signals, said converted physical signals representing a converted value being at least an approximation of said transfer function of said mapped value; and processing said converted physical signals to produce output physical signals, said output physical signals representing an output value being a de-mapped version, from said standard segment to said input value segment, of said converted value.

2. A method according to claim 1, wherein said self-similarity characteristic is ratiometric, and wherein said plurality of segments occupy ratiometrically related portions of said input value range.

3. A method according to claim 2, wherein said transfer function is a function of the form $y = x^a$, where a is a constant.

4. A method according to claim 2, wherein the largest of said segments in said plurality occupies the high order half of said input value range, wherein said input physical signals represent said input value in binary, and wherein said step of processing input physical signals comprises the step of binary-shifting said input physical signals such that said mapped physical signals represent a value within said standard segment.

5. A method according to claim 1, wherein said portion of said input value range is less than said entire input value range.

6. A method according to claim 1, further comprising the step of processing said output physical signals with said input physical signals to produce further signals, said further signals representing a further value being a weighting factor W times said input value, plus (1-W) times said output value, W being selectable from a predetermined set of available weighting factors.

7. A method according to claim 6, wherein said predetermined set of available weighting factors consists of the factors 0 and 1.

8. A method according to claim 6, wherein said predetermined set of available weighting factors consists of the factors 0 and 1 and at least one value within the range (0,1).

9. A method according to claim 6, wherein said predetermined set of available weighting factors consists of the factors 0, ½ and 1.

10. A method for producing physical signals representing a power function approximation of an input value which is included within a predefined portion of a predefined input value range, said portion of said input value range being divided into a plurality of segments, one of said segments being a standard segment, and one of said segments including said input value and being an input value segment, comprising the steps of:

processing input physical signals representing said input value to produce mapped physical signals, said mapped physical signals representing a mapped value being a mapped version of said input value from said input value segment to said standard segment;

processing said mapped physical signals to produce converted physical signals, said converted physical signals representing a converted value being at least an approximation of said power function of said mapped value; and processing said converted physical signals to produce output physical signals, said output physical signals representing an output value being a de-mapped version, from said standard segment to said input value segment, of said converted value.

11. A method according to claim 10, wherein said portion of said input value range is less than said entire input value range, said method being further for producing physical signals representing a power function approximation of an input value which is included in a special treatment segment of said input value range distinct from said portion of said input value range, further comprising the step of processing said input physical signals according to a straight line approximation to produce output physical signals representing an output value if said input value is within said special treatment segment.

12. A method according to claim 10, wherein said step of processing said mapped signals comprises the step of providing said mapped signals to an input port of conversion circuitry which produces said converted signals in response to signals on said input port, said conversion circuitry being able to convert input port values represented on said input port if said input port values are within said standard segment but not if said input port values are within any of said input value segments which are distinct from said standard segment.

13. A method according to claim 12, wherein said conversion circuitry is able to convert input port values represented on said input port only if said input port values are within said standard segment.

14. A method according to claim 10, wherein said segments occupy ratiometrically increasing portions of said input value range, the largest of said segments occupying the high order half of said input value range, wherein said input physical signals represent said input value in binary, and wherein said step of processing input physical signals comprises the step of binary-shifting said input physical signals such that said mapped physical signals represent a value within said standard segment.

15. A method according to claim 14, wherein said standard segment is said high-order half of said input value range, and wherein said step of binary-shifting comprises the step of left-shifting said input physical signals until the signal on the high-order bit of said mapped physical signals represents a predefined first logic state.

16. A method according to claim 10, wherein said segments occupy ratiometrically increasing portions of said input value range, the largest of said segments occupying the high-order half of said input value range, wherein said input physical signals represent said input value in binary, and wherein said step of processing input physical signals comprises the steps of:

determining the number of bit positions in said input physical signals between the most significant one of said bit positions and the most significant one of said bit positions which is carrying a signal representing a predefined first logic state; and left-shifting said input physical signals by said number of bit positions.

17. A method according to claim 10, wherein said segments occupy ratiometrically increasing portions of said input value range, the largest of said segments occupying a highest order portion of said input value range, and wherein said step of processing said converted physical signals comprises the step of providing said converted physical signals to a first input port of multiplying circuitry which multiplies the value represented by the signals on its input port by a multiplier which is responsive to the input value segment of said input value.

18. A method according to claim 17, wherein said input physical signals represent said input value in binary, and wherein said step of processing said converted physical signals further comprises the step of determining said multiplier in response to the number of bit positions in said input physical signals between the most significant one of said bit positions and the most significant one of said bit positions which is carrying a signal representing a predefined first logic state.

19. A method according to claim 10, wherein said segments occupy ratiometrically increasing portions of said input value range, the largest of said segments occupying the high-order half of said input value range, wherein said input physical signals represent said input value in binary, and wherein said step of processing said converted physical signals comprises the steps of:

providing said converted physical signals to a first input port of multiplying circuitry;

determining the number of bit positions in said input physical signals between the most significant one of said bit positions and the most significant one of said bit positions which is carrying a signal representing a logic 1;

looking up a multiplier in a memory in response to said number of bit positions; and providing said multiplier to a second input port of said multiplying circuitry.

20. A method according to claim 10, wherein said segments occupy ratiometrically increasing portions of said input value range, the largest of said segments occupying the high-order half of said input value range, wherein said input physical signals represent said input value in binary, and wherein said step of processing said converted physical signals comprises the steps of: providing said converted physical signals to a first input port of multiplying circuitry, said multiplying circuitry having a second input port indicating which of a plurality of multipliers by which the value represented on said first input port is to be multiplied, said plurality of multipliers including different multipliers for different ones of said segments;

determining the number of bit positions in said input physical signals between the most significant one of said bit positions and the most significant one of said bit positions which is carrying a signal representing a logic 1; and providing said number of bit positions to said second input port of said multiplying circuitry.

21. A method according to claim 20, wherein said step of processing input physical signals comprises the step of left-shifting said input physical signals by said number of bit positions.

22. A method according to claim 10, wherein said approximation is exact.

23. A method according to claim 10, wherein said approximation is a straight line approximation.

24. A method according to claim 10, wherein said step of processing said mapped physical signals comprises the step of looking up said converted value in a memory in response to said mapped physical signals.

25. A method according to claim 24, wherein said memory is large enough to contain converted values for only the input values in said standard segment.

26. A method according to claim 24, wherein said segments occupy ratiometrically increasing portions of said input value range, wherein said mapped physical signals represent said mapped value in binary, and wherein said step of looking up comprises the step of providing a low-order proper subset of said mapped physical signals as an address to said memory.

27. A method according to claim 10, wherein said step of processing said mapped physical signals comprises the steps of:

multiplying said mapped value by a predetermined slope factor; and adding a predetermined base value.

28. A method according to claim 27, wherein said predetermined slope factor and said predetermined base value are fixed, said step of processing said mapped physical signals further comprising the step of adding a correction value responsive to said mapped physical signals.

29. A method according to claim 10, wherein said segments occupy ratiometrically increasing portions of said input value range, the largest of said segments occupying the high-order half of said input value range, wherein said mapped physical signals represent said mapped value in binary, and wherein said step of processing said mapped physical signals comprises the steps of:

stripping off the high-order one of said mapped physical signals;

right-shifting the remainder of said mapped physical signals by one bit;

adding a predetermined fixed base value; and adding a correction value responsive to said mapped physical signals.

30. A method according to claim 29, wherein said input physical signals represent said input value in binary, and wherein said step of processing input physical signals comprises the steps of:

determining the number of bit positions in said input physical signals between the most significant one of said bit positions and the most significant one of said bit positions which is carrying a signal representing a logic 1; and left-shifting said input physical signals by said number of bit positions, said step of stripping off the high-order one of said mapped physical signals occurring as part of said step of left-shifting said input physical signals.

31. A method according to claim 10, further comprising the step of processing said output physical signals with said input physical signals to produce further signals, said further signals representing a further value being a weighting factor W times said input value, plus (1-W) times said output value, W being selectable from a predetermined set of available weighting factors.

32. A method for pre-correcting a color input value for gamma-distortion of the light output of a phosphor as a function of the driving voltage applied to an electron beam incident on said phosphor, said color input value being included within a predefined portion of a predefined input value range, said portion of said input value range being divided into a plurality of segments, one of said segments being a standard segment, and one of said segments including said input value and being an input value segment, comprising the steps of:

processing input physical signals representing said input value to produce mapped physical signals, said mapped physical signals representing a mapped version of said input value from said input value segment to said standard segment;

processing said mapped physical signals to produce converted physical signals, said converted physical signals representing at least an approximation of a gamma correction function of said mapped version of said input value; and processing said converted physical signals to produce output physical signals, said output physical signals representing a de-mapped version, from said standard segment to said input value segment, of said approximation of said gamma correction function of said mapped version of said input value.

33. A method according to claim 32, further comprising the step of applying a driving voltage for an electron beam incident on a phosphor in response to said output physical signals.

34. A method according to claim 32, further comprising the step of processing said output physical signals with said input physical signals to produce further signals, said further signals representing a further value being by a weighting factor W times said input value, plus (1-W) times said output value, W being selectable from a predetermined set of available weighting factors.

35. A method for pre-correcting color input values for gamma-distortion of the light output of a phosphor as a function of the driving voltage applied to an electron beam incident on said phosphor, each of said color input values defining a color value for a respective one of a plurality of pixels on a surface carrying said phosphor, said plurality of pixels cooperating to form an image, each of said color input values being included within a predefined portion of a predefined input value range, said portion of said input value range being divided into a plurality of segments, one of said segments being a standard segment, and each of said input values being included within a respective input value segment, comprising the steps of:

mapping each of said input values which is not already within said standard segment, by a mapping function from the input value segment of the input value to said standard segment, to form respective mapped values;

converting each of said mapped values by at least an approximation of said gamma correction function of said mapped values, to form respective converted values;

de-mapping each of said converted values which did not derive from an input value which was within said standard segment, by a de-mapping function from said standard segment to the input value segment of the input value from which the converted value derived, to form respective corrected values; and providing said corrected values for application as a driving voltage for an electron beam incident on said phosphor at a position on said surface corresponding to each respective one of said pixels.

36. A method according to claim 35, further comprising, before said step of providing said corrected values for application as a driving voltage, the step of averaging each of said corrected values with the input value from which the corrected value derived, with a weighting factor W which is selectable from a predetermined set of available weighting factors including 0 and 1.

37. A method for pre-correcting color input values for gamma-distortion of the light output of a phosphor as a function of the driving voltage applied to an electron beam incident on said phosphor, each of said color input values defining a color value for a respective one of a plurality of pixels on a surface carrying said phosphor, said plurality of pixels cooperating to form at least part of an image, each of said color input values being represented in binary by a respective group of input physical signals, comprising the steps of:

determining the number of bit positions in each given one of said groups of input physical signals between the most significant one of said bit positions in said group and the most significant one of said bit positions in said group which is carrying a signal representing a logic 1;

left-shifting said given group of input physical signals by said number of bit positions to provide a given group of mapped physical signals representing a given mapped value;

converting said given mapped value by at least a linear approximation of said gamma correction function, to form a given converted value represented by a given group of converted physical signals;

providing said given group of converted physical signals to a first input port of multiplying circuitry, said multiplying circuitry having a second input port indicating which of a plurality of different multipliers by which the value represented on said first input port is to be multiplied; and providing said number of bit positions for said given one of said input values to said second input port of said multiplying circuitry, said multiplying circuitry providing through an output port a given group of converted physical signals representing a gamma-corrected value for said given input value.

38. A method according to claim 37, wherein said step of converting comprises the steps of:

multiplying said given mapped value by a predetermined fixed slope factor to provide an intermediate value;

adding a predetermined fixed base value to said intermediate value; and further adding to said intermediate value a correction value responsive to said given group of mapped physical signals.

39. Apparatus for performing a transfer function on any input value within a first input compliance range, comprising:

mapping circuitry which binary shifts each of said input values by a respective number of bits such that said shifted input values are within a second input compliance range smaller than said first input compliance range;

conversion circuitry coupled to receive said shifted input values and which converts each of said shifted input values according to said transfer function; and demapping circuitry coupled to receive said converted values and which demaps each of said converted values by an inverse transformation responsive to the number of bits by which said mapping circuitry shifted the respective input value.

40. Apparatus according to claim 39, wherein the highest order logic 1 in each input value in said second input compliance range is in the same bit position for all possible input values in said second input compliance range, and wherein said mapping circuitry comprises an encoder which determines said number of bits for each of said input values as the number of bits between the highest order logic 1 in the input value and said bit position of the highest order logic 1 in an input value in said second input compliance range.

41. Apparatus according to claim 40, wherein said conversion circuitry uses only bit positions which are of lower order than said highest order logic 1 in an input value in said second input compliance range, to convert each of said shifted input values according to said transfer function.

42. Apparatus according to claim 40, wherein said inverse transformation responsive to the number of bit positions by which said mapping circuitry shifted an input value, comprises multiplication of each of said converted values by a factor responsive only to said number of bit position by which said mapping circuitry shifted the respective input value.

43. Apparatus according to claim 39, wherein said inverse transformation responsive to the number of bit positions by which said mapping circuitry shifted an input value, comprises multiplication of each of said values by a factor responsive to said number of bit position by which said mapping circuitry shifted the respective input value.

44. Apparatus according to claim 39, wherein said demapping circuitry produces demapped values, further comprising subsequent circuitry coupled to receive said demapped values and which averages each of said demapped values with a respective one of said input values, using a weighting factor W which is selectable from a predetermined set of available weighting factors.

45. Apparatus according to claim 44, wherein said predetermined set of available weighting factors includes 0 and 1.

46. Apparatus according to claim 44, wherein said predetermined set of available weighting factors consists of 0 and 1.

47. Apparatus according to claim 44, wherein said predetermined set of available weighting factors consists of 0, 1 and at least one value within the range (0,1).

48. Computation apparatus for use with first input signals representing a sequence of first input values, comprising:

an encoder having an input coupled to receive said first input signals and having an encoder output, said encoder providing on said encoder output a signal indicating the number of bit positions between a fixed predetermined bit position and the bit position of the highest order logic 1 present in each input value represented by said first input signals, at least when said number of bit positions is within a predefined set;

a shifter coupled to receive said first input signals and said encoder output, said shifter having an output and providing on said output a version of each of said first input signals binary shifted by the number of bits indicated by said encoder output, at least when said number of bit positions is within a predefined set;

conversion circuitry having an input coupled to receive said output of said shifter and having an output, said conversion circuitry providing on said conversion circuitry output, signals representing a predefined mathematical function of each of the values represented by the signals on said conversion circuitry input, at least when said number of bit positions is within a predefined set; and inverse transformation circuitry coupled to receive said conversion circuitry output signals and said encoder output signals, said inverse transformation circuitry having an output and providing on said inverse transformation circuitry output signals representing each of the values represented by said conversion circuitry output signals multiplied a factor responsive to said encoder output signals, at least when said number of bit positions is within a predefined set.

49. Apparatus according to claim 48, wherein said fixed predetermined bit position is the highest order bit position of said first input signal.

50. Apparatus according to claim 48, wherein said predefined mathematical function is a power function.

51. Apparatus according to claim 48, wherein said conversion circuitry comprises a ROM look-up table.

52. Apparatus according to claim 48, wherein said conversion circuitry comprises:

a linear approximator which provides output signals representing each of the values represented on said conversion circuitry input multiplied by a slope constant and added to a base constant;

a non-linear corrector providing output signals representing the difference between each of said linear approximator outputs and said transfer function of the corresponding value represented on said conversion circuitry input; and an adder adding said linear approximator output signals to the corresponding ones of said non-linear corrector output signals to provide said conversion circuitry output.

53. Apparatus according to claim 52, wherein said slope constant is an integer power of two.

54. Apparatus according to claim 53, wherein said slope factor is a negative integer power of two.

55. Apparatus according to claim 48, further comprising special treatment circuitry coupled to receive said first input signals, said special treatment circuitry having an output which supersedes said inverse transformation circuitry output when said number of bit positions is outside said predefined set, said special treatment circuitry providing on said special treatment circuitry output, signals representing a special treatment function of said first input value.

56. Apparatus according to claim 55, further comprising subsequent circuitry coupled to receive said inverse transformation circuitry output signals and said first input signals, said subsequent circuitry having an output and providing on said subsequent circuitry output signals representing a weighted average, by a weighting factor W, of each of the values represented by said inverse transformation circuitry output signals with an input signal represented by said first input signals, W being selectable from a predetermined set of available weighting factors.

57. Apparatus according to claim 48, further comprising subsequent circuitry coupled to receive said inverse transformation circuitry output signals and said first input signals, said subsequent circuitry having an output and providing on said subsequent circuitry output signals representing a weighted average, by a weighting factor W, of each of the values represented by said inverse transformation circuitry output signals with an input signal represented by said first input signals, W being selectable from a predetermined set of available weighting factors.

* * * * *